(12) United States Patent
Gillen

(10) Patent No.: US 10,182,305 B2
(45) Date of Patent: Jan. 15, 2019

(54) SECURE LOCATION-BASED EVENTS AND NOTIFICATIONS

(71) Applicant: United Parcel Service of America, Inc., Atlanta, GA (US)

(72) Inventor: Robert J. Gillen, Alpharetta, GA (US)

(73) Assignee: United Parcel Service Of America, Inc., Atlanta, GA (US)

( * ) Notice: Subject to any disclaimer, the term of this patent is extended or adjusted under 35 U.S.C. 154(b) by 0 days.

(21) Appl. No.: 14/942,034

(22) Filed: Nov. 16, 2015

(65) Prior Publication Data
US 2016/0316322 A1 Oct. 27, 2016

Related U.S. Application Data

(60) Provisional application No. 62/152,068, filed on Apr. 24, 2015.

(51) Int. Cl.
| | | |
|---|---|---|
| *H04W 4/02* | (2018.01) | |
| *G06Q 10/08* | (2012.01) | |
| *G06Q 50/28* | (2012.01) | |

(52) U.S. Cl.
CPC ......... *H04W 4/02* (2013.01); *G06Q 10/0833* (2013.01); *G06Q 50/28* (2013.01)

(58) Field of Classification Search
CPC .. G06Q 10/08; G06Q 10/0833; G06Q 10/083; G06Q 10/08355; G06Q 10/0832; G06Q 10/087; G06Q 50/28; G08G 1/123
See application file for complete search history.

(56) References Cited

U.S. PATENT DOCUMENTS

| | | |
|---|---|---|
| 6,618,668 B1 | 9/2003 | Laird |
| 6,975,941 B1 | 12/2005 | Lau et al. |
| 7,212,829 B1 | 5/2007 | Lau et al. |
| 7,647,231 B2 | 1/2010 | Kuebert et al. |
| 7,693,745 B1 | 4/2010 | Pomerantz et al. |
| 8,015,023 B1 | 9/2011 | Lee et al. |
| 8,179,238 B2 | 5/2012 | Roberts, Sr. et al. |
| 8,215,546 B2 | 7/2012 | Lin et al. |

(Continued)

FOREIGN PATENT DOCUMENTS

| | | |
|---|---|---|
| WO | WO 2014/033559 A1 | 3/2014 |
| WO | WO 2015/002667 A1 | 1/2015 |

OTHER PUBLICATIONS

Bennyblogger, "Imminent Delivery Notification", *Your Postal Blog*, Sep. 19, 2013, 4 pages, retrieved from <https://yourpostalblog.wordpress.com/2013/09/19/imminent-delivery-notification/> on Jul. 18, 2016.

DPD Group, "Follow My Parcel", retrieved from <http://www.dpd.co.uk/content/products_services/followmyparcel.jsp> on Jul. 18, 2016, 3 pages.

(Continued)

*Primary Examiner* — Kathy Wang-Hurst
*Assistant Examiner* — Ernest Tacsik
(74) *Attorney, Agent, or Firm* — Shook, Hardy and Bacon, L.L.P.

(57) ABSTRACT

Computer program products, methods, systems, apparatus, and computing entities are provided. In one embodiment, the location of entities (e.g., computing entities and establishments) can be monitored or identified to determine whether they are within a configurable/determinable distance/proximity from each other. Such determinations can be used to automatically provide notifications and/or allow or disallow events.

12 Claims, 19 Drawing Sheets

(56) References Cited

U.S. PATENT DOCUMENTS

| | | |
|---|---|---|
| 9,082,096 B2 | 7/2015 | Parameswaran et al. |
| 2001/0042055 A1 | 11/2001 | Didriksen et al. |
| 2002/0016171 A1 | 2/2002 | Doganata et al. |
| 2002/0103653 A1 | 8/2002 | Huxter |
| 2004/0236635 A1 | 11/2004 | Publicover |
| 2007/0052586 A1* | 3/2007 | Horstemeyer ... G06Q 10/06311 342/457 |
| 2007/0083410 A1* | 4/2007 | Hanna ............ G06Q 10/08 705/333 |
| 2009/0012802 A1 | 1/2009 | Pinney |
| 2011/0202427 A1 | 8/2011 | Garcia Jurado Suarez et al. |
| 2011/0238300 A1 | 9/2011 | Schenken |
| 2012/0030133 A1 | 2/2012 | Rademaker |
| 2013/0103606 A1 | 4/2013 | Holliday |
| 2014/0180959 A1 | 6/2014 | Gillen et al. |
| 2014/0222711 A1 | 8/2014 | Tibbs et al. |
| 2014/0266669 A1 | 9/2014 | Fadell et al. |
| 2014/0279648 A1 | 9/2014 | Whitehouse |
| 2015/0088652 A1 | 3/2015 | Finley et al. |
| 2015/0120602 A1 | 4/2015 | Huffman et al. |
| 2015/0199643 A1* | 7/2015 | Hubner ............ G06Q 10/0833 705/333 |
| 2015/0241565 A1* | 8/2015 | Chavez ............ G01S 19/14 702/150 |
| 2016/0314429 A1 | 10/2016 | Gillen et al. |
| 2017/0262798 A1 | 9/2017 | Kosseifi et al. |

OTHER PUBLICATIONS

International Searching Authority, International Search Report and Written Opinion for International Application No. PCT/US2016/027528, dated May 30, 2016, 10 pages, European Patent Office, The Netherlands.

Namiot, D., et al., "Geofence and Network Proximity", Internet of Things, Smart Spaces, and Next Generation Networking, 2013, 6 pages, Springer, Germany retrieved from <http://arxiv.org/ftp/arxiv/papers/1303/1303.5943.pdf> on Jul. 13, 2016.

Steinfield, Charles, "The Development of Location Based Services in Mobile Commerce", 2004, retrieved from <https://msu.edu/~steinfie/elifelbschap.pdf> on Jul. 18, 2016, 15 pages.

Lou, Zhe, "NFC Enabled Smart Postal System", 2010 Second International Workshop on Near Field Communication, Apr. 2010, pp. 33-38, IEEE, U.S.A.

Unknown Author, "Australia Post Develops Wearable Parcel Delivery App", Austria Post Newsroom, Apr. 24, 2015, 1 page retrieved from <https://auspost.newsroom.com.au/Content/Default/01-News-Releases/Article/Australia-Post-develops-wearable-parcel-delivery-app/-3/27/6031> on Sep. 21, 2016.

Wang, Bin, et al., "An Efficient Self-Service Pre-Payment Courier System on Mobile NFC Technology", International Journal of U- and E-Service, Science and Technology, 2015, vol. 8, No. 4, pp. 103-112, SERSC, Korea.

International Preliminary Examining Authority, Written Opinion for International Application No. PCT/US2016/027528, dated Apr. 20, 2017, 6 pages, European Patent Office, Germany.

* cited by examiner

| Event | Location | Level | Configurable Parameters | | | |
|---|---|---|---|---|---|---|
| | | | Entity / Location | Entity / Location | Entity / Location | Entity / Location |
| LB Notifications, Deliveries | Garage at Home | 2 | Registered Mobile | John's Home | N/A | N/A |
| LB Notifications, Deliveries | Front Door at Home | 3 | John's Mobile | John's Home | John's Vehicle | N/A |
| LB Notifications, Deliveries | Front Door at Work | 4 | John's Mobile | John's Work | John's Vehicle | N/A |
| LB Notifications, Pick-Ups, Deliveries | Mobile Customer | 5 | John's Mobile | John's Vehicle | Carrier Vehicle | Carrier Mobile |

Fig. 7

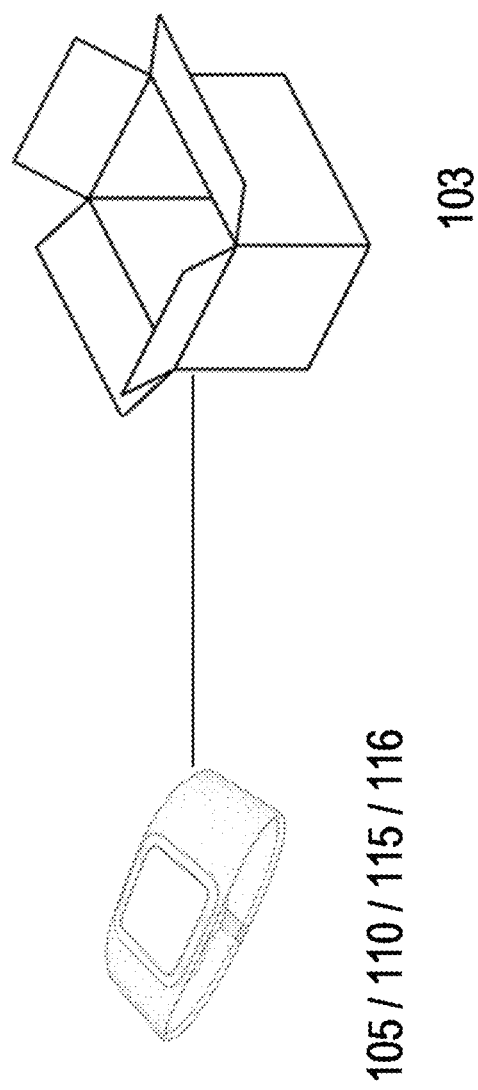

SECURE LOCATION-BASED EVENTS AND NOTIFICATIONS

CROSS-REFERENCE TO RELATED APPLICATIONS

This application claims priority to U.S. Provisional Application No. 62/152,068 filed Apr. 24, 2015, which is hereby incorporated herein in its entirety by reference.

BACKGROUND

With an ever-increasing need for mobility and flexibility in item pick-up and item delivery contexts, new techniques and approaches for item security and verification are needed to maintain the integrity in such processes.

BRIEF SUMMARY

In general, embodiments of the present invention provide methods, apparatus, systems, computing devices, computing entities, and/or the like for secure location-based events and/or secure location-based notifications/messages.

In accordance with one aspect, a method is provided. In one embodiment, the method comprises (1) identifying the location of a first entity, the location of a second entity, and the location of a third entity; (2) determining whether the first entity, the second entity, and the third entity are within a configurable/determinable distance/proximity from each other; and (3) responsive to determining that the first entity, the second entity, and the third entity are within the configurable/determinable distance/proximity from each other, automatically providing a notification to an electronic destination address.

In accordance with another aspect, a computer program product is provided. The computer program product may comprise at least one non-transitory computer-readable storage medium having computer-readable program code portions stored therein, the computer-readable program code portions comprising executable portions configured to (1) identify the location of a first entity, the location of a second entity, and the location of a third entity; (2) determine whether the first entity, the second entity, and the third entity are within a configurable/determinable distance/proximity from each other; and (3) responsive to determining that the first entity, the second entity, and the third entity are within the configurable/determinable distance/proximity from each other, automatically provide a notification to an electronic destination address.

In accordance with yet another aspect, an apparatus comprising at least one processor and at least one memory including computer program code is provided. In one embodiment, the at least one memory and the computer program code may be configured to, with the processor, cause the apparatus to (1) identify the location of a first entity, the location of a second entity, and the location of a third entity; (2) determine whether the first entity, the second entity, and the third entity are within a configurable/determinable distance/proximity from each other; and (3) responsive to determining that the first entity, the second entity, and the third entity are within the configurable/determinable distance/proximity from each other, automatically provide a notification to an electronic destination address.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

FIGS. 6-19 are exemplary input and output produced in accordance with various embodiments of the present invention.

DETAILED DESCRIPTION

Figure 1:
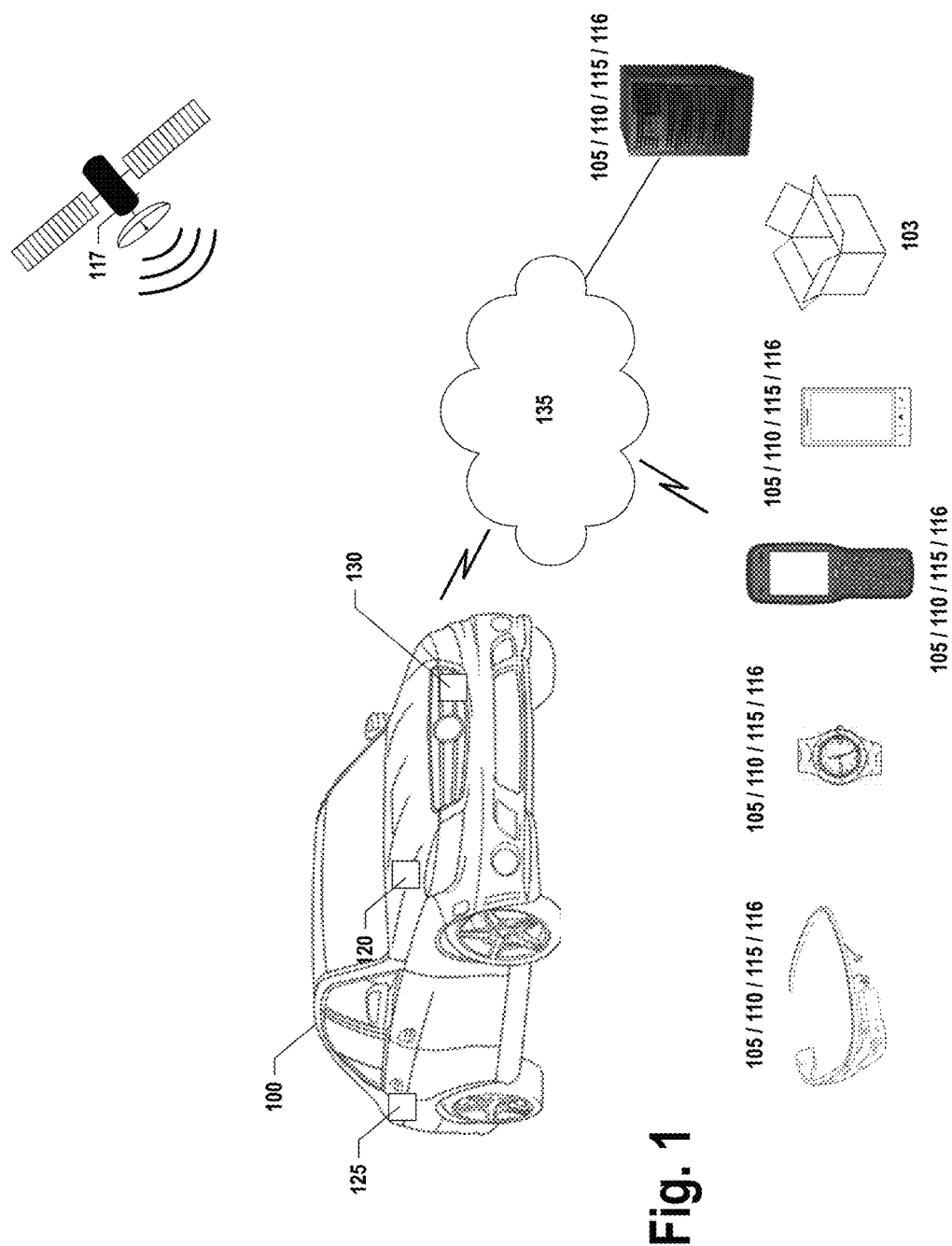
FIG. 1 is a diagram of a system that can be used to practice various embodiments of the present invention.

Various embodiments of the present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "exemplary" are used to be examples with no indication of quality level. Like numbers refer to like elements throughout.

I. COMPUTER PROGRAM PRODUCTS, METHODS, AND COMPUTING ENTITIES

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

II. EXEMPLARY SYSTEM ARCHITECTURE

FIG. 1 provides an illustration of a system that can be used in conjunction with various embodiments of the present invention. As shown in FIG. 1, the system may include one or more vehicles 100, one or more items 103, one or more carrier computing entities 105, one or more customer computing entities 110, one or more user computing entities 115, one or more establishment computing entities 116, one or more Global Positioning System (GPS) satellites 117, one or more location sensors 120, one or more telematics sensors 125, one or more information/data collection devices 130, one or more networks 135, and/or the like. Each of the components of the system may be in electronic communication with, for example, one another over the same or different wireless or wired networks including, for example, a wired or wireless Personal Area Network (PAN), Local Area Network (LAN), Metropolitan Area Network (MAN), Wide Area Network (WAN), and/or the like. Additionally, while FIG. 1 illustrates certain system entities as separate, standalone entities, the various embodiments are not limited to this particular architecture.

1. Exemplary Vehicle

In various embodiments, the term vehicle 100 is used generically. In one embodiment, a vehicle may be a carrier vehicle, such as a manned or an unmanned tractor, a truck, a car, a motorcycle, a moped, a Segway, a bicycle, a golf cart, a hand truck, a cart, a trailer, a tractor and trailer combination, a van, a flatbed truck, a vehicle, a drone, an aerial vehicle, an airplane, a helicopter, a barge, a boat, and/or any other form of object for moving or transporting people and/or items (e.g., one or more packages, parcels, bags, containers, loads, crates, items banded together, vehicle parts, pallets, drums, the like, and/or similar words used herein interchangeably). Further, a vehicle may be a customer vehicle, an establishment vehicle, and/or the like. In one embodiment, each vehicle 100 may be associated with a unique vehicle identifier (such as a vehicle ID) that uniquely identifies the vehicle 100. The unique vehicle ID may include characters, such as numbers, letters, symbols, and/or the like. For example, an alphanumeric vehicle ID (e.g., "AS445" and/or "1G6AF5SX6D0125409") may be associated with each vehicle 100. In another embodiment, the unique vehicle ID may be the license plate, registration number, or other identifying information/data assigned to the vehicle 100.

Figure 2:
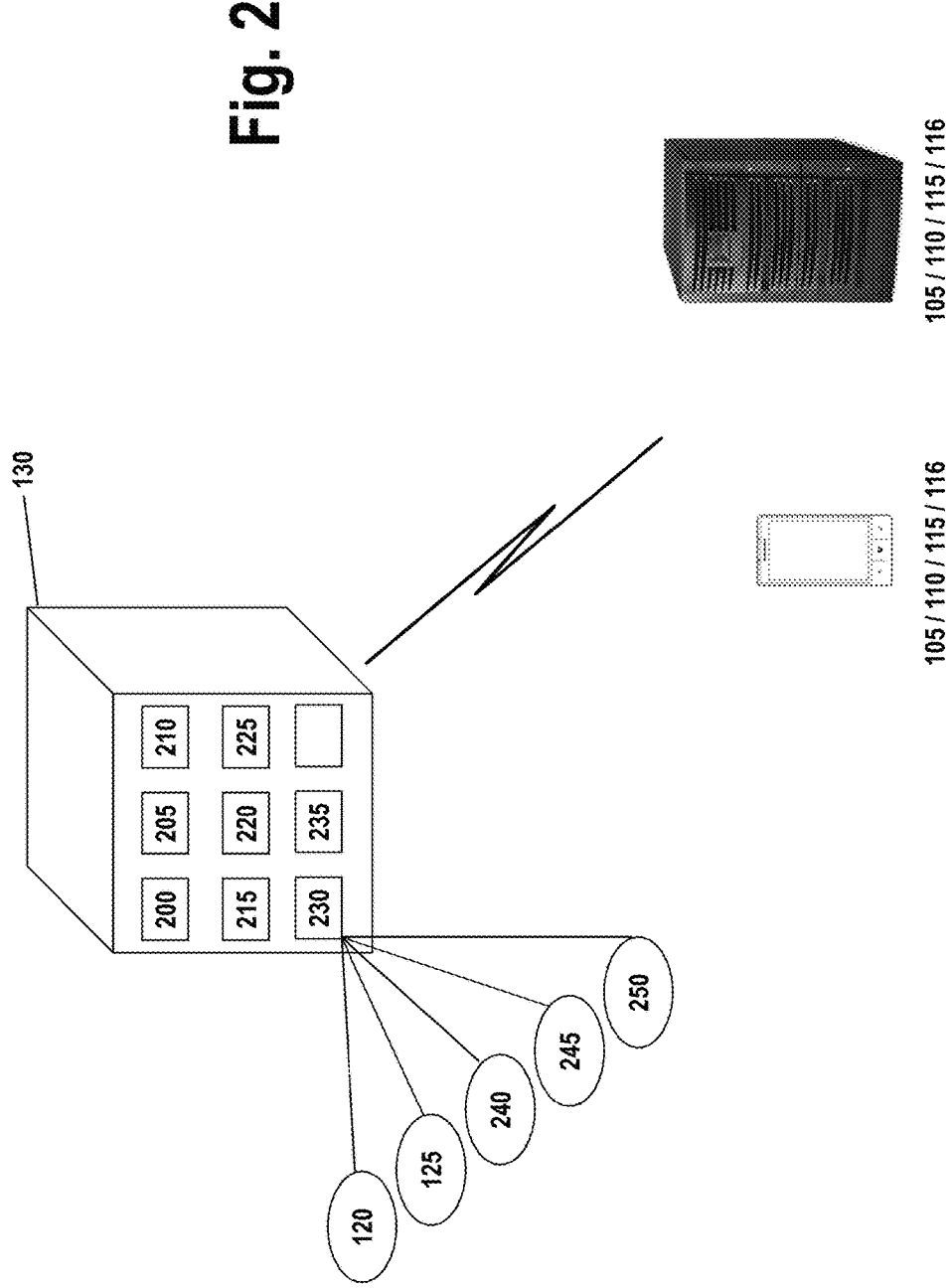
FIG. 2 is a diagram of an information/data collection device that may be used in association with certain embodiments of the present invention.

FIG. 1 shows one or more computing entities, devices, and/or similar words used herein interchangeably that are associated with the vehicle 100, such as an information/data collection device 130 or other computing entities. In general, the terms computing entity, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, radio frequency identification (RFID) tags, ear pieces, scanners, televisions, dongles, cameras, wristbands, wearable items/devices, items/devices, vehicles, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. FIG. 2 provides a block diagram of an exemplary information/data collection device 130 that may be attached, affixed, disposed upon, integrated into, or part of a vehicle 100. The information/data collection device 130 may collect telematics information/data (including location data) and transmit/send the information/data to various other computing entities via one of several communication methods.

In one embodiment, the information/data collection device 130 may include, be associated with, or be in wired or wireless communication with one or more processors 200 (various exemplary processors are described in greater detail below), one or more location-determining devices or one or more location sensors 120 (e.g., Global Navigation Satellite System (GNSS) sensors), one or more telematics sensors 125, one or more real-time clocks 215, a J-Bus protocol architecture, one or more electronic control modules (ECM) 245, one or more communication ports 230 for receiving telematics information/data from various sensors (e.g., via a CAN-bus), one or more communication ports 205 for transmitting/sending data, one or more RFID tags/sensors 250, one or more power sources 220, one or more information/data radios 235 for communication with a variety of communication networks, one or more memory modules 210, and one or more programmable logic controllers (PLC) 225. It should be noted that many of these components may be located in the vehicle 100 but external to the information/data collection device 130.

In one embodiment, the one or more location sensors 120, modules, or similar words used herein interchangeably may be one of several components in wired or wireless communication with or available to the information/data collection device 130. Moreover, the one or more location sensors 120 may be compatible with GPS satellites 117, such as Low Earth Orbit (LEO) satellite systems, Department of Defense (DOD) satellite systems, the European Union Galileo positioning systems, the Chinese Compass navigation systems, Indian Regional Navigational satellite systems, and/or the like. This information/data can be collected using a variety of coordinate systems, such as the Decimal Degrees (DD); Degrees, Minutes, Seconds (DMS); Universal Transverse Mercator (UTM); Universal Polar Stereographic (CARRIER) coordinate systems; and/or the like. Alternatively, triangulation may be used in connection with a device associated with a particular vehicle 100 and/or the vehicle's operator and with various communication points (e.g., cellular towers or Wi-Fi access points) positioned at various locations throughout a geographic area to monitor the location of the vehicle 100 and/or its operator. The one or more location sensors 120 may be used to receive latitude, longitude, altitude, heading or direction, geocode, course, position, time, and/or speed information/data (e.g., referred to herein as telematics information/data and further described herein below). The one or more location sensors 120 may also communicate with a variety of computing entities.

As indicated, in addition to the one or more location sensors 120, the information/data collection device 130 may include and/or be associated with one or more telematics sensors 125, modules, and/or similar words used herein interchangeably. For example, the telematics sensors 125 may include vehicle sensors, such as engine, fuel, odometer, hubometer, tire pressure, location, weight, emissions, door, and speed sensors. The telematics information/data may include, but is not limited to, speed data, emissions data, RPM data, tire pressure data, oil pressure data, seat belt usage data, distance data, fuel data, idle data, and/or the like (e.g., referred to herein as telematics data). The telematics sensors 125 may include environmental sensors, such as air quality sensors, temperature sensors, and/or the like. Thus, the telematics information/data may also include carbon monoxide (CO), nitrogen oxides (NOx), sulfur oxides (SOx), Ethylene Oxide (EtO), ozone ($O_3$), hydrogen sulfide ($H_2S$) and/or ammonium ($NH_4$) data, and/or meteorological information/data (e.g., referred to herein as telematics data).

In one embodiment, the ECM 245 may be one of several components in communication with and/or available to the information/data collection device 130. The ECM 245, which may be a scalable and subservient device to the information/data collection device 130, may have information/data processing capability to decode and store analog and digital inputs from vehicle systems and sensors. The ECM 245 may further have information/data processing capability to collect and present telematics information/data to the J-Bus (which may allow transmission to the information/data collection device 130), and output standard vehicle diagnostic codes when received from a vehicle's J-Bus-compatible on-board controllers 240 and/or sensors.

As indicated, a communication port 230 may be one of several components available in the information/data collection device 130 (or be in or as a separate computing entity). Embodiments of the communication port 230 may include an Infrared information/data Association (IrDA) communication port, an information/data radio, and/or a serial port. The communication port 230 may receive instructions for the information/data collection device 130. These instructions may be specific to the vehicle 100 in which the information/data collection device 130 is installed, specific to the geographic area in which the vehicle 100 will be traveling, specific to the function the vehicle 100 serves within a fleet, and/or the like. In one embodiment, the information/data radio 235 may be configured to communicate with a wireless wide area network (WWAN), wireless local area network (WLAN), wireless personal area network (WPAN), or any combination thereof. For example, the information/data radio 235 may communicate via various wireless protocols, such as 802.11, general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, Bluetooth protocols (including Bluetooth low energy (BLE)), wireless universal serial bus (USB) protocols, and/or any other wireless protocol.

2. Exemplary Item

In one embodiment, an item 103 may be any tangible and/or physical object. In one embodiment, an item 103 may be or be enclosed in one or more packages, envelopes, parcels, bags, goods, products, containers, loads, crates, items banded together, vehicle parts, pallets, drums, the like, and/or similar words used herein interchangeably. In one embodiment, each item 103 may include and/or be associated with an item/shipment identifier, such as an alphanumeric identifier. Such item/shipment identifiers may be represented as text, barcodes, tags, character strings, Aztec Codes, MaxiCodes, Data Matrices, Quick Response (QR) Codes, electronic representations, and/or the like. A unique item/shipment identifier (e.g., 123456789) may be used by the carrier to identify and track the item 103 as it moves through the carrier's transportation network. Further, such item/shipment identifiers can be affixed to items 103 by, for example, using a sticker (e.g., label) with the unique item/shipment identifier printed thereon (in human and/or machine readable form) or an RFID tag with the unique item/shipment identifier stored therein. Such items may be referred to as "connected" items 103 and/or "non-connected" items 103.

In one embodiment, connected items 103 include the ability to determine their locations and/or communicate with various computing entities. This may include the item 103 being able to communicate via a chip or other devices, such as an integrated circuit chip, RFID technology, Near Field Communication (NFC) technology, Bluetooth technology, Wi-Fi technology, and any other suitable communication techniques, standards, or protocols with one another and/or communicate with various computing entities for a variety of purposes. Connected items 103 may include one or more components that are functionally similar to those of the carrier computing entity 105 and/or the customer computing entity 110 as described below. For example, in one embodiment, each connected item 103 may include one or more processing elements, one or more display device/input devices (e.g., including user interfaces), volatile and non-volatile storage or memory, and/or one or more communications interfaces. In this regard, in some example embodiments, an item 103 may communicate send "to" address information/data, received "from" address information/data, unique identifier codes, location information/data, status information/data, and/or various other information/data.

In one embodiment, non-connected items 103 do not typically include the ability to determine their locations and/or might not be able communicate with various computing entities or are not designated to do so by the carrier. The location of non-connected items 103 can be determined with the aid of other appropriate computing entities. For example, non-connected items 103 can be scanned (e.g., affixed barcodes, RFID tags, and/or the like) or have the containers or vehicles in which they are located scanned or located. As will be recognized, an actual scan or location determination of an item 103 is not necessarily required to determine the location of an item 103. That is, a scanning operation might not actually be performed on a label affixed directly to an item 103 or location determination might not be made specifically for or by an item 103. For example, a label on a larger container housing many items 103 can be scanned, and by association, the location of the items 103 housed within the container are considered to be located in the container at the scanned location. Similarly, the location of a vehicle 100 transporting many items can be determined, and by association, the location of the items 103 being transported by the vehicle 100 are considered to be located in the vehicle 100 at the determined location. These can be referred to as "logical" scans/determinations or "virtual" scans/determinations. Thus, the location of the items 103 is based on the assumption they are within the container or vehicle 100, despite the fact that one or more of such items 103 might not actually be there.

3. Exemplary Carrier Computing Entity

Figure 3:
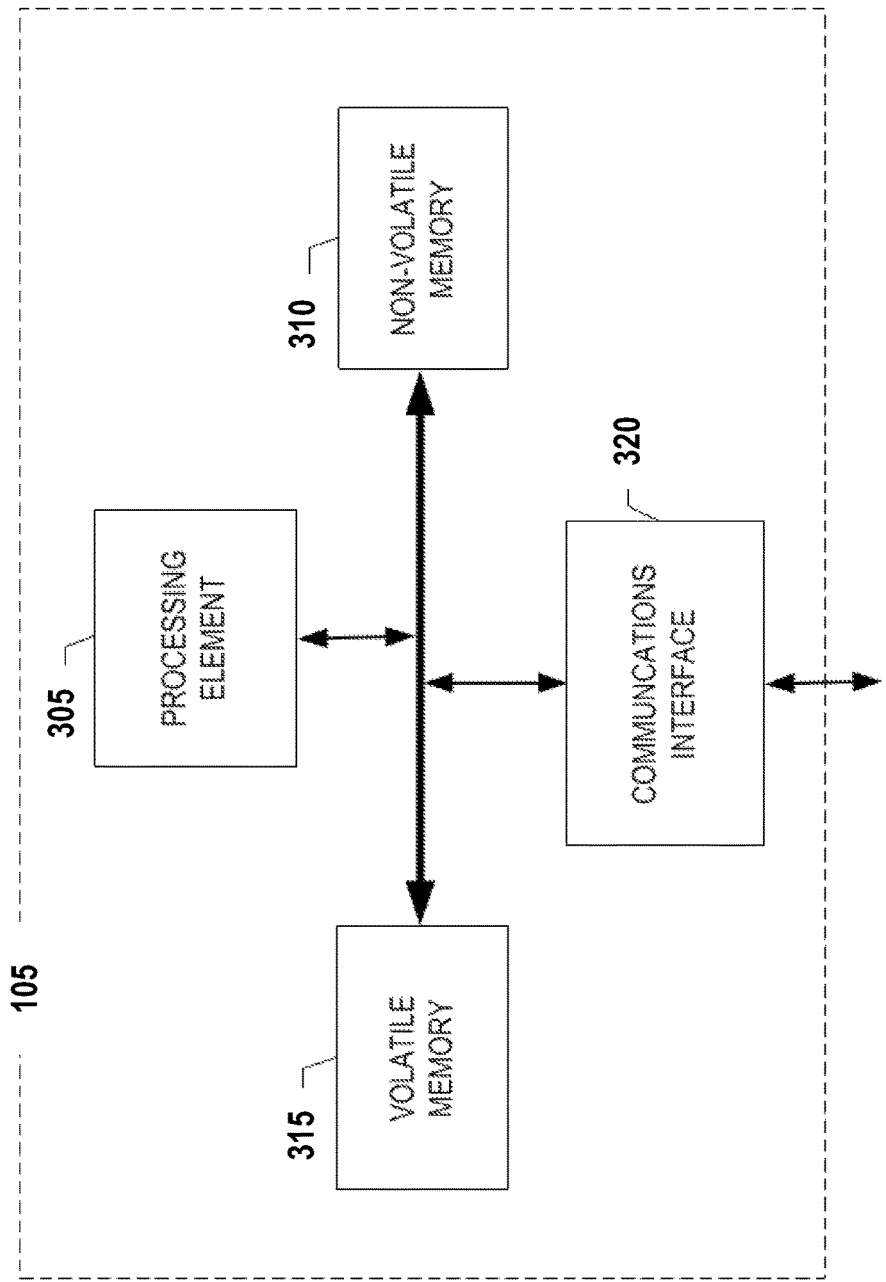
FIG. 3 is a schematic of a carrier computing entity in accordance with certain embodiments of the present invention.

FIG. 3 provides a schematic of a carrier computing entity 105 according to one embodiment of the present invention. A carrier may be a traditional carrier, such as United Parcel Service, FedEx, DHL, courier services, the United States Postal Service (USPS), Canadian Post, freight companies (e.g. truck-load, less-than-truckload, rail carriers, air carriers, ocean carriers, etc.), and/or the like. However, a carrier may also be a nontraditional carrier, such as Amazon, Google, Uber, ride-sharing services, crowd-sourcing services, retailers, and/or the like. A carrier computing entity 105 may be located at a carrier location and/or the like, such as a carrier service center, will call, kiosk, drop-box, locker system, hub, facility, and/or the like. In general, the terms computing entity, entity, device, system, and/or similar words used herein interchangeably may refer to, for example, one or more computers, computing entities, desktop computers, mobile phones, tablets, phablets, notebooks, laptops, distributed systems, gaming consoles (e.g., Xbox, Play Station, Wii), watches, glasses, iBeacons, proximity beacons, key fobs, RFID tags, ear pieces, scanners, televisions, dongles, cameras, wristbands, wearable items/devices, items/devices, vehicles, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably.

As indicated, in one embodiment, the carrier computing entity 105 may also include one or more communications interfaces 320 for communicating with various computing entities, such as by communicating data, content, information, and/or similar terms used herein interchangeably that can be transmitted, received, operated on, processed, displayed, stored, and/or the like. The carrier computing entity 105 can also be used for making, receiving, and/or transferring payments. Payments may be in a variety of forms, such as via debit cards, credit cards, direct credits, direct debits, cash, check, money order, Internet banking, e-commerce payment networks/systems (e.g., PayPal™, Google Wallet, Amazon Payments), virtual currencies (e.g., Bitcoins), award or reward points, and/or the like. Such payments may be made using a variety of techniques and approaches, including through NFC technologies such as PayPass, Android Beam, Bluetooth low energy (BLE), and various other contactless payment systems. Further, such payment technologies may include PayPal Beacon, Booker, Erply, Leaf, Apple Pay, Leapset, Micros, PayPal Here, Revel, ShopKeep, TouchBistro, Vend, and/or the like.

As shown in FIG. 3, in one embodiment, the carrier computing entity 105 may include or be in communication with one or more processing elements 305 (also referred to as processors, processing circuitry, and/or similar terms used herein interchangeably) that communicate with other elements within the carrier computing entity 105 via a bus, for example. As will be understood, the processing element 305 may be embodied in a number of different ways. For example, the processing element 305 may be embodied as one or more complex programmable logic devices (CPLDs), microprocessors, multi-core processors, coprocessing entities, application-specific instruction-set processors (ASIPs), and/or controllers. Further, the processing element 305 may be embodied as one or more other processing devices or circuitry. The term circuitry may refer to an entirely hardware embodiment or a combination of hardware and computer program products. Thus, the processing element 305 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 305 may be configured for a particular use or configured to execute instructions stored in volatile or non-volatile media or otherwise accessible to the processing element 305. As such, whether configured by hardware or computer program products, or by a combination thereof, the processing element 305 may be capable of performing steps or operations according to embodiments of the present invention when configured accordingly.

In one embodiment, the carrier computing entity 105 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 310 as described above, such as hard disks, ROM, PROM, EPROM, EEPROM, flash memory, MMCs, SD memory cards, Memory Sticks, CBRAM, PRAM, FeRAM, RRAM, SONOS, racetrack memory, and/or the like. As will be recognized, the non-volatile storage or memory media may store databases, database instances, database management system entities, data, applications, programs, program modules, scripts, source code, object code, byte code, compiled code, interpreted code, machine code, executable instructions, and/or the like. The term database, database instance, database management system entity, and/or similar terms used herein interchangeably may refer to a structured collection of records or information/data that is stored in a computer-readable storage medium, such as via a relational database, hierarchical database, and/or network database.

In one embodiment, the carrier computing entity 105 may further include or be in communication with volatile media (also referred to as volatile storage, memory, memory storage, memory circuitry and/or similar terms used herein interchangeably). In one embodiment, the volatile storage or memory may also include one or more volatile storage or memory media 315 as described above, such as RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. As will be recognized, the volatile storage or memory media may be used to store at least portions of the databases, database instances, database management system entities, data, applications, programs, program modules, scripts, source code, object code, byte code, compiled code, interpreted code, machine code, executable instructions, and/or the like being executed by, for example, the processing element 305. Thus, the databases, database instances, database management system entities, data, applications, programs, program modules, scripts, source code, object code, byte code, compiled code, interpreted code, machine code, executable instructions, and/or the like may be used to control certain aspects of the operation of the carrier computing entity 105 with the assistance of the processing element 305 and operating system.

As indicated, in one embodiment, the carrier computing entity 105 may also include one or more communications interfaces 320 for communicating with various computing entities, such as by communicating data, content, information, and/or similar terms used herein interchangeably that can be transmitted, received, operated on, processed, displayed, stored, and/or the like.

Such communication may be executed using a wired information/data transmission protocol, such as fiber distributed information/data interface (FDDI), digital subscriber line (DSL), Ethernet, asynchronous transfer mode (ATM), frame relay, information/data over cable service interface specification (DOCSIS), or any other wired transmission protocol. Similarly, the carrier computing entity 105 may be configured to communicate via wireless external communication networks using any of a variety of protocols, such as GPRS, UMTS, CDMA2000, 1xRTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol. Although not shown, the carrier computing entity 105 may include or be in communication with one or more input elements, such as a keyboard input, a mouse input, a touch screen/display input, audio input, pointing device input, joystick input, keypad input, and/or the like. The carrier computing entity 105 may also include or be in communication with one or more output elements (not shown), such as audio output, video output, screen/display output, motion output, movement output, and/or the like.

As will be appreciated, one or more of the carrier computing entity's 105 components may be located remotely from other carrier computing entity 105 components, such as in a distributed system. Furthermore, one or more of the components may be combined and additional components performing functions described herein may be included in the carrier computing entity 105. Thus, the carrier computing entity 105 can be adapted to accommodate a variety of needs and circumstances.

4. Exemplary Customer Computing Entity

Figure 4:
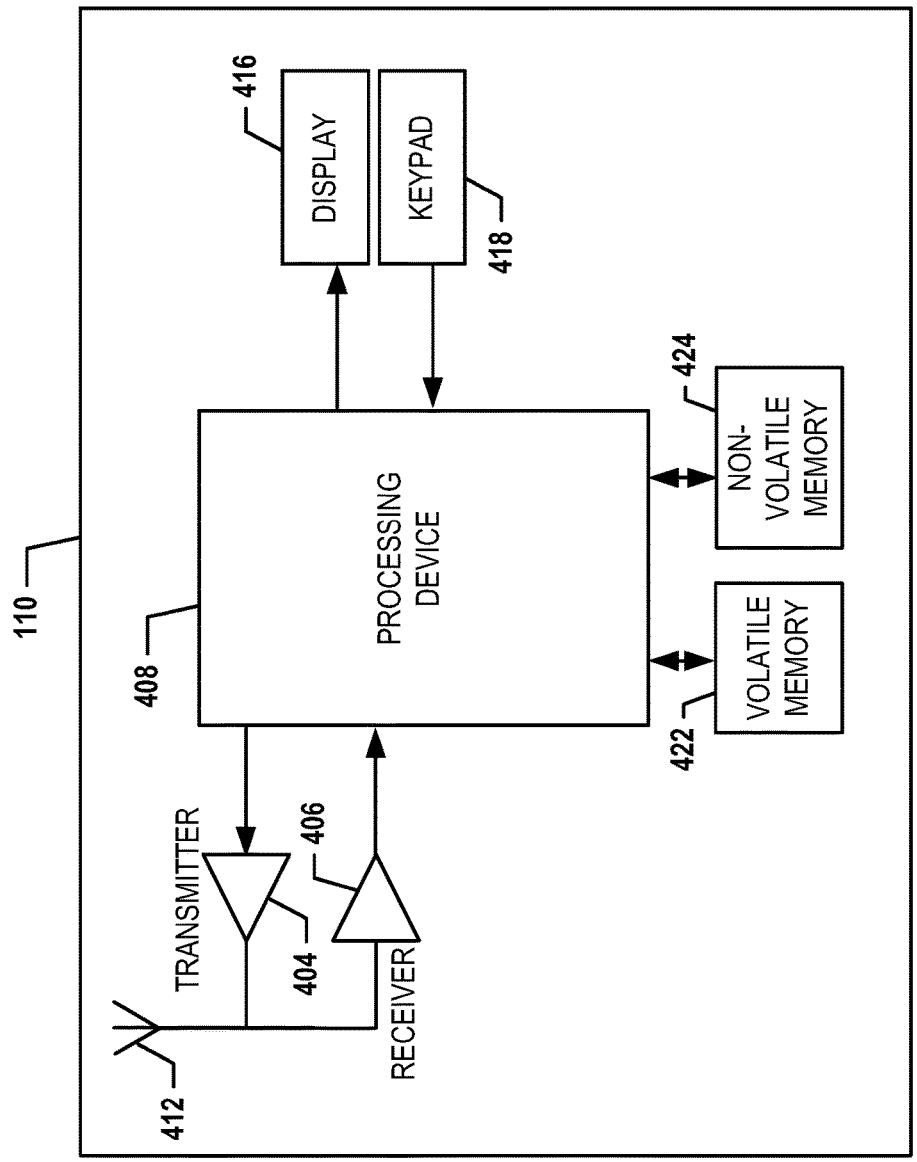
FIG. 4 is a schematic of a customer computing entity in accordance with certain embodiments of the present invention.

A customer may be an individual, a family, a family member, a company, an organization, an entity, a department within an organization, a representative of an organization and/or person, and/or the like. Depending on the context, customers may be consignors and/or consignees. Accordingly, the term customer may refer to both consignors and/or consignees interchangeably. FIG. 4 provides an illustrative schematic representative of a customer computing entity 110 that can be used in conjunction with embodiments of the present invention. In one embodiment, the customer computing entities 110 may include one or more components that are functionally similar to those of the carrier computing entity 105 and/or as described below. As shown in FIG. 4, a customer computing entity 110 can include an antenna 412, a transmitter 404 (e.g., radio), a receiver 406 (e.g., radio), and a processing element 408 that provides signals to and receives signals from the transmitter 404 and receiver 406, respectively.

The signals provided to and received from the transmitter 404 and the receiver 406, respectively, may include signaling information/data in accordance with an air interface standard of applicable wireless systems to communicate with various entities, such as vehicles 100, carrier computing entities 105, and/or the like. In this regard, the customer computing entity 110 may be capable of operating with one or more air interface standards, communication protocols, modulation types, and access types. More particularly, the customer computing entity 110 may operate in accordance with any of a number of wireless communication standards and protocols. In a particular embodiment, the customer computing entity 110 may operate in accordance with multiple wireless communication standards and protocols, such as GPRS, UMTS, CDMA2000, 1×RTT, WCDMA, TD-SCDMA, LTE, E-UTRAN, EVDO, HSPA, HSDPA, Wi-Fi, WiMAX, UWB, IR protocols, Bluetooth protocols, USB protocols, and/or any other wireless protocol.

Via these communication standards and protocols, the customer computing entity 110 can communicate with various other entities using concepts such as Unstructured Supplementary Service information/data (USSD), Short Message Service (SMS), Multimedia Messaging Service (MMS), Dual-Tone Multi-Frequency Signaling (DTMF), and/or Subscriber Identity Module Dialer (SIM dialer). The customer computing entity 110 can also download changes, add-ons, and updates, for instance, to its firmware, software (e.g., including executable instructions, applications, program modules), and operating system. For example, in one embodiment, the customer computing entity 110 may store and execute a carrier application to assist in communicating with the carrier and/or for providing location services regarding the same.

According to one embodiment, the customer computing entity 110 may include location determining aspects, devices, modules, functionalities, and/or similar words used herein interchangeably. For example, the customer computing entity 110 may include outdoor positioning aspects, such as a location module adapted to acquire, for example, latitude, longitude, altitude, geocode, course, direction, heading, speed, UTC, date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information/data may be determined by triangulating the customer computing entity's 110 position in connection with a variety of other systems, including cellular towers, Wi-Fi access points, and/or the like. Similarly, the customer computing entity 110 may include indoor positioning aspects, such as a location module adapted to acquire, for example, latitude, longitude, altitude, geocode, course, direction, heading, speed, time, date, and/or various other information/data. Some of the indoor aspects may use various position or location technologies including RFID tags, indoor beacons or transmitters, Wi-Fi access points, cellular towers, nearby computing devices (e.g., smartphones, laptops) and/or the like. For instance, such technologies may include iBeacons, Gimbal proximity beacons, BLE transmitters, NFC transmitters, and/or the like. These indoor positioning aspects can be used in a variety of settings to determine the location of someone or something to within inches or centimeters.

The customer computing entity 110 may also comprise a user interface (that can include a display 416 coupled to a processing element 408) and/or a user input interface (coupled to a processing element 408). For example, the user interface may be an application, browser, user interface, dashboard, webpage, and/or similar words used herein interchangeably executing on and/or accessible via the customer computing entity 110 to interact with and/or cause display of information. The user input interface can comprise any of a number of devices allowing the customer computing entity 110 to receive data, such as a keypad 418 (hard or soft), a touch display, voice/speech or motion interfaces, scanners, readers, or other input device. In embodiments including a keypad 418, the keypad 418 can include (or cause display of) the conventional numeric (0-9) and related keys (#, *), and other keys used for operating the customer computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes. Through such inputs the customer computing entity can collect contextual information/data as part of the telematics data.

The customer computing entity 110 can also include volatile storage or memory 422 and/or non-volatile storage or memory 424, which can be embedded and/or may be removable. For example, the non-volatile memory may be ROM, PROM, EPROM, EEPROM, flash memory, MMCs, SD memory cards, Memory Sticks, CBRAM, PRAM, FeRAM, RRAM, SONOS, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, RIMM, DIMM, SIMM, VRAM, cache memory, register memory, and/or the like. The volatile and non-volatile storage or memory can store databases, database instances, database management system entities, data, applications, programs, program modules, scripts, source code, object code, byte code, compiled code, interpreted code, machine code, executable instructions, and/or the like to implement the functions of the customer computing entity 110.

5. Exemplary User Computing Entity

As will be recognized, user computing entities 115 can be operated by various parties, including a carrier pick-up/delivery person and/or operators of vehicles 100. For example, a user may be a carrier pick-up/delivery person picking up items from and/or delivering items to customers. Moreover, a user computing entity 115 may include one or more components that are functionally similar to those of the carrier computing entity 105 and/or the customer computing entity 110. For example, in one embodiment, each user computing entity 115 may include one or more processing elements (e.g., CPLDs, microprocessors, multi-core processors, coprocessing entities, ASIPs, microcontrollers, and/or controllers), one or more display device/input devices (e.g., including user interfaces), volatile and non-volatile storage or memory, and/or one or more communications interfaces. For example, the user interface may be a user application, browser, user interface, and/or similar words used herein interchangeably executing on and/or accessible via the user computing entity 115 to interact with and/or cause display of information from various other computing entities. As will be recognized, these architectures and descriptions are provided for exemplary purposes only and are not limiting to the various embodiments.

6. Exemplary Establishment and/or Establishment Computing Entity

In one embodiment, an establishment (also referenced as a location or physical address) may be a residence, work location, customer delivery location, customer pick-up location, multi-tenant dwelling, commercial office building, apartment, and/or the like. In another embodiment, an establishment by be an organization or entity that provides various products, items, foods, services, and/or the like. For example, an establishment may be a brick-and-mortar store, service center, kiosk, locker system, warehouse, office building, and/or the like. A customer may register such establishments as secure establishments for pick-ups and/or deliveries. E-commerce establishments may include macys.com, dell.com, walmart.com, apple.com, staples.com, amazon.com, bestbuy.com, costco.com, alibaba.com, ebay.com, netflix.com, sears.com. Other establishments may include physical locations that customers can visit, such as Starbucks, Target, Publix, schools, Joe's Crab Shack, and/or the like. And further establishments may include hospitals, health clinics, legal offices, government buildings, and/or the like. The coordinates and/or location information of the establishment can be determined and stored by a variety of computing entities. An establishment may be associated with and/or have on the premises one or more establishment computing entities 116. An establishment computing entity 116 may include one or more components that are functionally similar to those of the carrier computing entity 105, the customer computing entity 110, the user computing entity 115, and/or the like. In one embodiment, each establishment computing entity 116 may include one or more processing elements (e.g., CPLDs, microprocessors, multi-core processors, coprocessing entities, ASIPs, microcontrollers, and/or controllers), one or more display device/input devices (e.g., including user interfaces), volatile and non-volatile storage or memory, and/or one or more communications interfaces. For example, the user interface may be a user application, browser, user interface, and/or similar words used herein interchangeably executing on and/or accessible via the establishment computing entity 116 to interact with and/or cause display of information from various other entities. As will be recognized, these architectures and descriptions are provided for exemplary purposes only and are not limiting to the various embodiments.

In one embodiment, establishment computing entities 116 may be fixed with regard to their geographic locations. As will be recognized, a variety of other approaches and techniques can be used to adapt to various needs and circumstances.

7. Exemplary Additional Computing Entities

As will be recognized, a variety of other computing entities and devices can be used to adapt to various needs and circumstances. For example, one or more service provider computing entities and one or more customer computing entities may be used with embodiments of the present invention. Such computing entities may include components and functionality similar to those described above.

III. EXEMPLARY SYSTEM OPERATION

Figure 5:
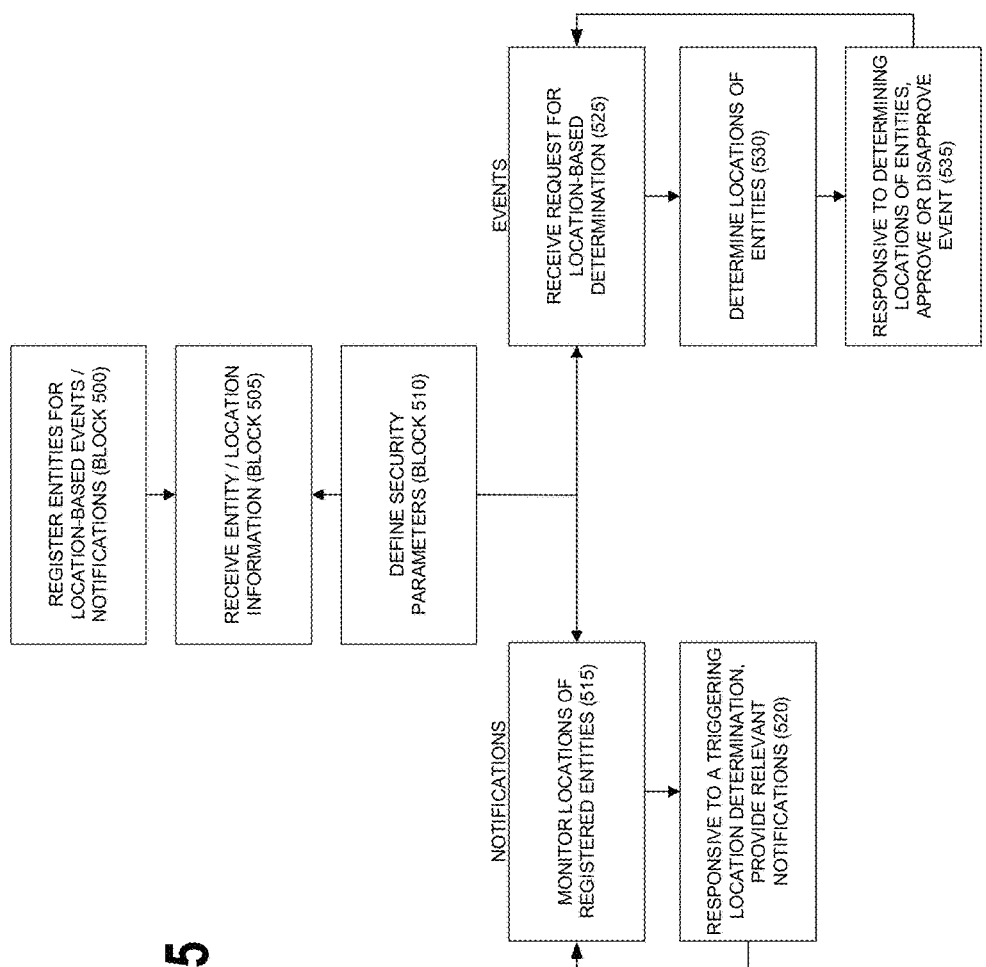
FIG. 5 is a flowchart illustrating operations and processes that can be used in accordance with various embodiments of the present invention.

Reference will now be made to FIGS. 5-19. FIG. 5 is a flowchart illustrating operations and processes that can be used in accordance with various embodiments of the present invention. FIGS. 6-19 are exemplary input and output produced in accordance with various embodiments of the present invention.

1. Registration

In one embodiment, as indicated in Block 500 of FIG. 5, the process may begin with the enrollment/registration of one or more customers for an account, subscription, program, and/or similar words used herein interchangeably. In another embodiment, the customer may be automatically enrolled/registered for the same. As previously noted, a customer may be an individual, a family, a family member, a company, an organization, an entity, a department within an organization, a representative of an organization and/or person, and/or the like. To register, a customer (e.g., a customer operating a customer computing entity 110) may access a webpage, application, dashboard, browser, or portal of an entity that provides notification/message services.

In one embodiment, as part of the enrollment/registration process, a customer (e.g., a customer operating a customer computing entity 110) may be requested to provide information/data (e.g., including customer information/data, biographic information/data, geographic information/data, device/entity information/data, establishment information/data, payment information/data, and/or the like) by the carrier computing entity 105 (e.g., via the registration module). The information/data may be manually input by a customer; may be automatically provided by allowing access to other accounts, such as Amazon.com, Facebook, Gmail, Twitter, PayPal, and/or the like; may be automatically collected by various computing entities (including automatic device identification); combinations thereof; and/or other techniques and approaches. For instance, the biographic information/data may include the customer's name, such as a first name, a last name, a company name, an entity name, an organization name, and/or the like. The geographic information/data may also include one or more physical addresses or locations associated with the customer (e.g., street address, city, state, postal code, and/or country). The physical addresses or locations may be establishment commercial addresses, residential addresses, commercial addresses, geocodes, latitude and longitude points, virtual addresses, and/or the like.

In one embodiment, the customer information/data may include one or more communication formats for communicating with the customer as part of his or her notification/message preferences. The communication formats may include text notifications/messages (e.g., SMS, MMS), email notifications/messages, voice notifications/messages, video notifications/messages (e.g., YouTube, the Vine), picture notifications/messages (e.g., Instagram), social media notifications/messages (e.g., private social media created internally for entities, business social media (e.g., Yammer, SocialCast), or public social media (e.g., Facebook, Instagram, Twitter)), and/or a variety of other notifications/messages in various communication formats. In addition to the one or more communication formats, the customer (e.g., operating a customer computing entity 110) can provide the corresponding electronic destination addresses to be used in providing information/data associated with the notification/message services to the customer (e.g., email addresses, online handles, phone numbers, usernames, etc.). For instance, for text notifications/messages, the customer may provide one or more cellular phone numbers. For email notifications/messages, the customer may provide one or more email addresses. And for voice notifications/messages, the customer may provide one or more cellular or landline phone numbers or other electronic destination addresses to which audio files can be delivered. Additionally, in one embodiment, validation operations can be performed with respect to each input electronic destination address—to ensure accuracy. As will be recognized, a variety of other types of electronic destination addresses can be used to adapt to various needs and circumstances.

Figure 6:
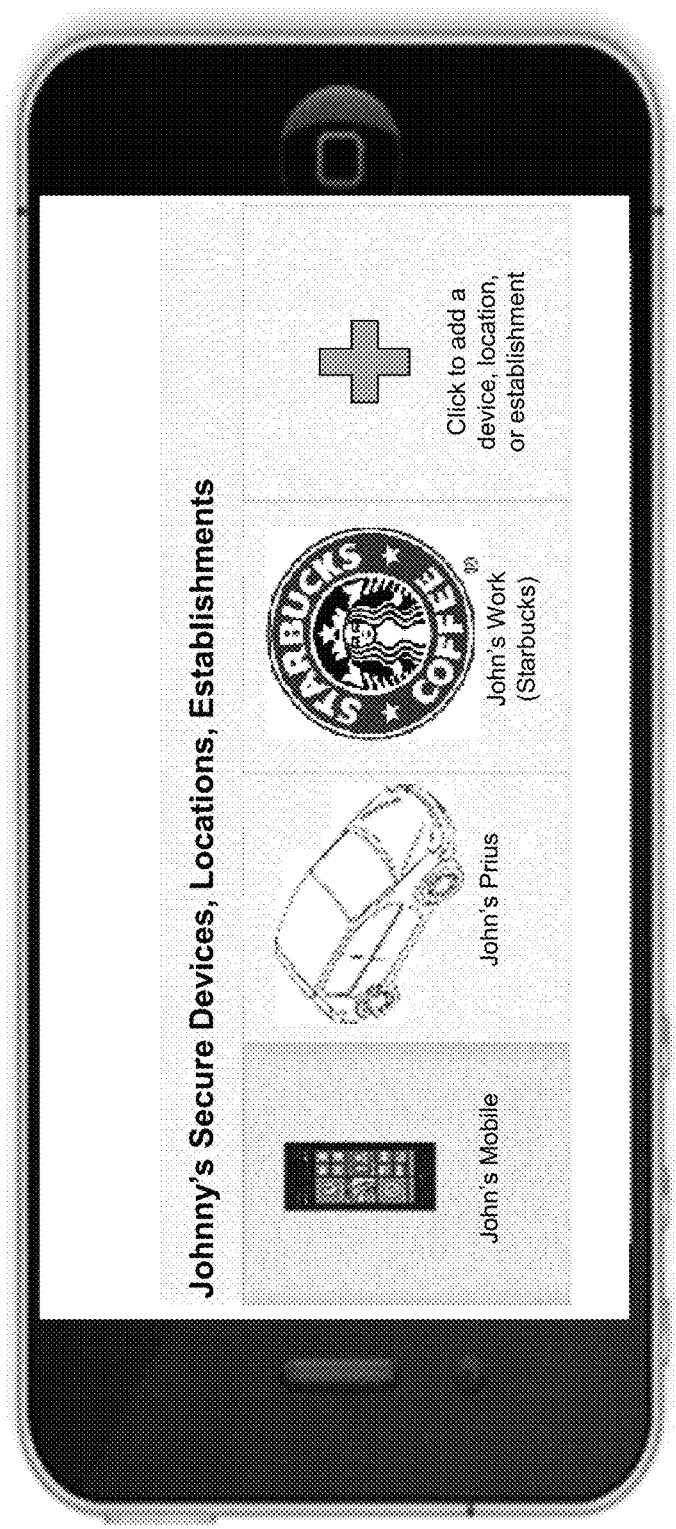
Figure 9:
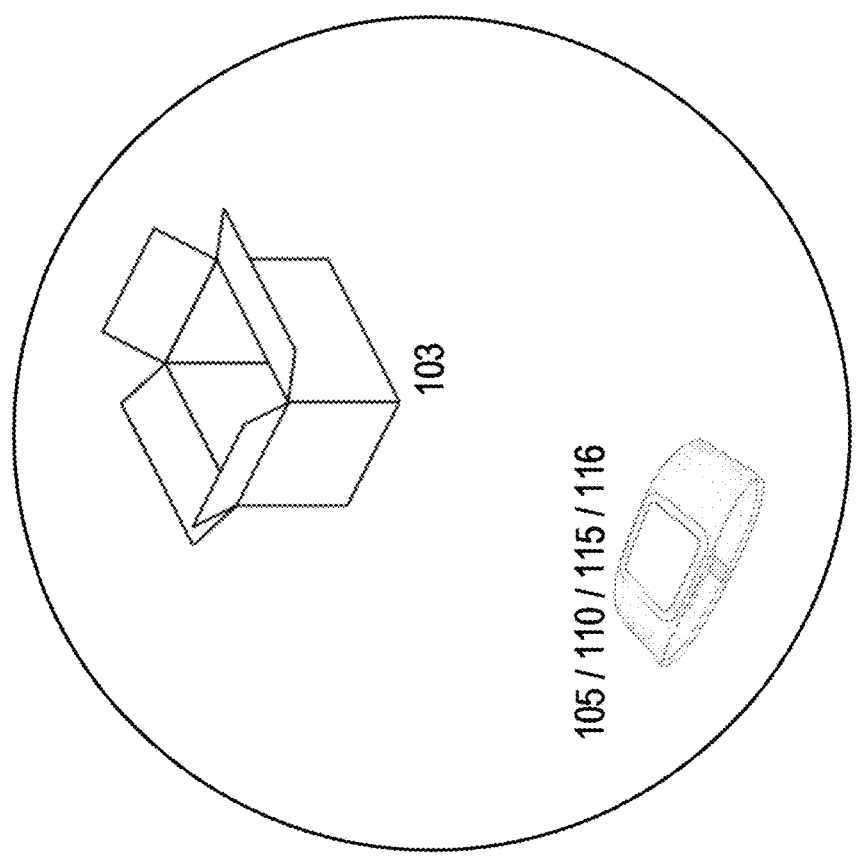

In one embodiment, as indicated in Block 505 of FIG. 5, device/entity information/data, customer information/data, establishment information/data, physical address or location information/data, and/or the like (customer computing entities 110, user computing entities 115, establishment computing entities 116, establishments, vehicles 100, and/or the like) may be received, provided, obtained, detected, assigned, collected, requested, and/or similar words used herein interchangeably as part of the registration/enrollment process. As will be recognized, device/entity information/data may be collected for any number of devices or entities for association with a customer's account, subscription, program, and/or similar words used herein interchangeably. The device/entity information/data may include one or more entity or device identifiers—phone numbers, Subscriber Identity Module (SIM) numbers, Media Access Control (MAC) addresses, International Mobile Subscriber Identity (IMSI) numbers, Internet Protocol (IP) addresses, Mobile Equipment Identifiers (MEIDs), unit identifiers (e.g., GPS unit identifiers, Unique Device Identifiers (UDiDs), mobile identification numbers (MINs), IMSI_S (Short IMSIs), email addresses, usernames, Globally Unique Identifiers (GUIDs), Integrated Circuit Card Identifiers (ICCIDs), electronic serial numbers (ESN), International Mobile Equipment Identities (IMEIs), Wi-Fi IDs, RFID tags, and/or the like. The device/entity information/data may include a device's vendor, model, specification authority, version, components, software specification and/or version, person associated with the device, and/or the like. The device/entity information/data may be used to track, monitor, connect with, communicate with, and/or the like the corresponding devices or entities. FIG. 6 shows an exemplary interface with the devices/entities, vehicles, locations, establishments, and/or the like associated with the given account. As shown in this figure, any information/data can be shown with regard to each corresponding device (including the names, nicknames, assigned names, and/or the like with whom the devices are associated). FIG. 6 shows John's mobile as being one of the devices/entities registered with his account.

As will be recognized from FIG. 5, various entities/devices, establishments, locations, and/or vehicles 100 can also be registered. For example, a customer can register or enroll his places of work, places he frequents, his home, and/or the like for secure location-based events and/or secure location-based notifications/messages. For example, John Smith may register his home at 123 Suburban Greens Drive, Atlanta, Ga. 33333. As part of registering his home, an appropriate computing entity can determine the location of the residence. For example, the latitude and longitude points can be determined via a query to a map database or website, by reverse geocoding, by interpolation, and/or the like. In this example, Mr. Smith's residence is located at 34.3218697, −83.1239871. In another example, Mr. Smith may work at Starbucks near his home—the Starbucks at 9999 Peachtree Road Northeast, Atlanta, Ga. 33331 (Store No. 20821943). As noted, the latitude and longitude points can be determined via a query to a map database or website, by reverse geocoding, by interpolation, and/or the like. In this example, the Starbucks is located at 33.7869128, −84.3875602. In one embodiment, the customer (e.g., operating a customer computing entity 110) can register establishments or locations as secure locations for pick-up and/or delivery services and/or for location-based notifications/messages. This may include defining one or more geofences, zones of confidence, and/or the like around the location and/or establishment. This may also include defining the size of the same-within carrier-imposed guidelines. As will be recognized, the customer can register any number of establishments and/or locations for secure location-based events and/or secure location-based notifications/messages. As shown in FIG. 6, the Starbucks is displayed via the interface as one of the registered locations or establishments.

In one embodiment, customers can also register or enroll one or more vehicles 100 for secure location-based events and/or secure location-based notifications/messages. For instance, the customer (e.g., operating a customer computing entity 110) can register one or more of his vehicles for secure location-based events and/or secure location-based notifications/messages. The customer can register her own vehicle 100, a significant other's vehicle 100, a relative's vehicle, and/or the like. This may include providing access to or obtaining information/data associated with the vehicle and/or vehicle devices/entities, such as the information/data collection device 130, location sensors 120, telematics sensors 125, communication ports 230/205, information/data radios 235, and/or the like. This information/data may include SIM numbers, MAC addresses, IMSI numbers, IP addresses, MEIDs, unit identifiers, IMSI_S, email addresses, usernames, GUIDs, ICCIDs, ESN, IMEIs, Wi-Fi IDs, RFID tags, and/or the like. FIG. 6 shows John's Prius as being a registered vehicle 100.

In one embodiment, with the appropriate information/data, the carrier computing entity 105 may create a customer profile for the customer via the enrollment/registration process. Accordingly, the carrier computing entity 105 may create, store, and/or have access to various customer profiles and/or information/data associated with the customer profiles. In addition to at least the information/data described above, a customer profile may include one or more corresponding usernames, passwords, images, tokens, challenge phrases, reminders, and/or the like (referred to herein as credentials) for accessing accounts, applications, services, entities, and/or the like.

a. Customer-Defined Configurable/Determinable Parameters

In one embodiment, once a customer profile has been created by the carrier computing entity 105, the customer (e.g., operating a customer computing entity 110) can define, identify, provide, and/or similar words used herein interchangeably one or more configurable/determinable parameters to be used in association with the customer's account, subscription, and/or program (Block 510 of FIG. 5). For instance, the customer can define one or more configurable/determinable parameters (e.g., configurable levels) to be used in association with specific events/actions and/or messages/notifications. For example, the customer (e.g., operating a customer computing entity 110) can define the number of entities that are required to generate a notification/message to the customer or a carrier pick-up/delivery person (and/or various other parties), automatically allow or disallow delivery or pick-up of an item 103 (at a vehicle, at a residence, at a commercial location, at an establishment), confirm that an item 103 was picked up or delivered, and/or the like. In one embodiment, each event may be associated with its own configurable/determinable parameters (see FIG. 7). In another embodiment, all events may be associated with the same configurable/determinable parameters (see FIG. 7).

b. Carrier-Defined Configurable/Determinable Parameters

In one embodiment, once a customer profile has been created by a carrier computing entity 105, the carrier computing entity 105 can provide one or more configurable/determinable parameters to be used in association with the customer's account, subscription, and/or program (Block 510 of FIG. 5). For example, a carrier computing entity 105 can define one or more configurable/determinable parameters (e.g., configurable levels) to be used in association with specific events/actions and/or messages/notifications. As noted, in one embodiment, each event may be associated with its own configurable/determinable parameters. In another embodiment, all events may be associated with the same configurable/determinable parameters.

In various embodiments, the configurable/determinable parameters may include generating a notification/message to the customer or carrier pick-up/delivery person (and/or various other parties), automatically allowing or disallowing delivery of an item 103 (at a vehicle, at a residence, at a commercial location, at an establishment), confirming that an item 103 was picked up or delivered, and/or the like. For example, in one embodiment, in the pick-up and delivery context, certain geographic areas may be referred to as "non-driver release areas." Non-driver release areas are areas in which a carrier pick-up/delivery person may not leave an item 103 unclaimed and/or unattended as part of delivery. To identify such areas, historical delivery information/data may be analyzed. For example, historical delivery information/data may include information/data regarding the theft of or damage to items left by the carrier at addresses within specific geographic areas without first obtaining a signature. Using this historical delivery information/data, the carrier may identify non-driver release areas in which personnel are not generally permitted to leave an item 103 without first obtaining a signature. In such areas, carrier pick-up/delivery persons are typically required to obtain a signature of the consignee or recipient because carrier experience may indicate that the item 103 may be stolen or damaged after the item 103 is relinquished by the carrier. In one embodiment, carrier efficiency in non-driver release areas can be increased by not requiring return trips in the event a consignee or recipient is unavailable to sign for an item 103 if one or more defined configurable/determinable parameters are satisfied. For example, the carrier computing entity 105 can define the number of entities that are required to trigger a specific event/action—such as automatically allowing or disallowing delivery of an item, initiating shipment of an item, initiating movement of an item, generating shipping data, and/or the like. If the specified configurable/determinable parameters are satisfied, a carrier pick-up/delivery person can release the item 103 for delivery and reduce the number of delivery attempts at the delivery address. As will be recognized, a variety of other security concerns can be addressed by the technical solutions described herein.

c. Exemplary Configurable/Determinable Parameters

FIG. 7 provides exemplary configurable/determinable parameters to help in understanding embodiments of the present invention (Block 510 of FIG. 5). In FIG. 7, five different configurable levels are represented (level 2, level 3, level 4, level 5). In one embodiment, the following examples can be applied to location-based notifications/messages, pick-ups, and/or deliveries to registered vehicles (e.g., to the trunk of vehicle 100). To generate or transmit a notification/message and/or make a corresponding pick-up or delivery from a registered vehicle 100, the various levels can require the location of entities, vehicles, establishments, and/or the like to be determined, ascertained, or known.

In one embodiment, the level 2 example applies to location-based notifications/messages and/or deliveries at the garage of John's registered home (e.g., location or establishment). As will be recognized, in the delivery context, such deliveries may include the customer's garage door opening or simply leaving an item 103 at a closed or open garage door (see FIGS. 8, 9, 14). As an added measure of security, in this example, level 2 requires that any mobile device (e.g., a registered smartphone or wearable for any member of the residence) and a home/residence (e.g., or a desktop, television, smart thermostat, and/or the like at the home/residence) be properly determined as being within the configurable/determinable parameters (e.g., being within a geofence, a zone of confidence, or a defined proximity of one another). In some embodiments, this can ensure that a notification/message is generated in a time-appropriate matter and/or that a delivery is being made to the correct delivery location and/or increase the likelihood that someone at the delivery location is present to minimize the risk of releasing the item.

Figure 10:
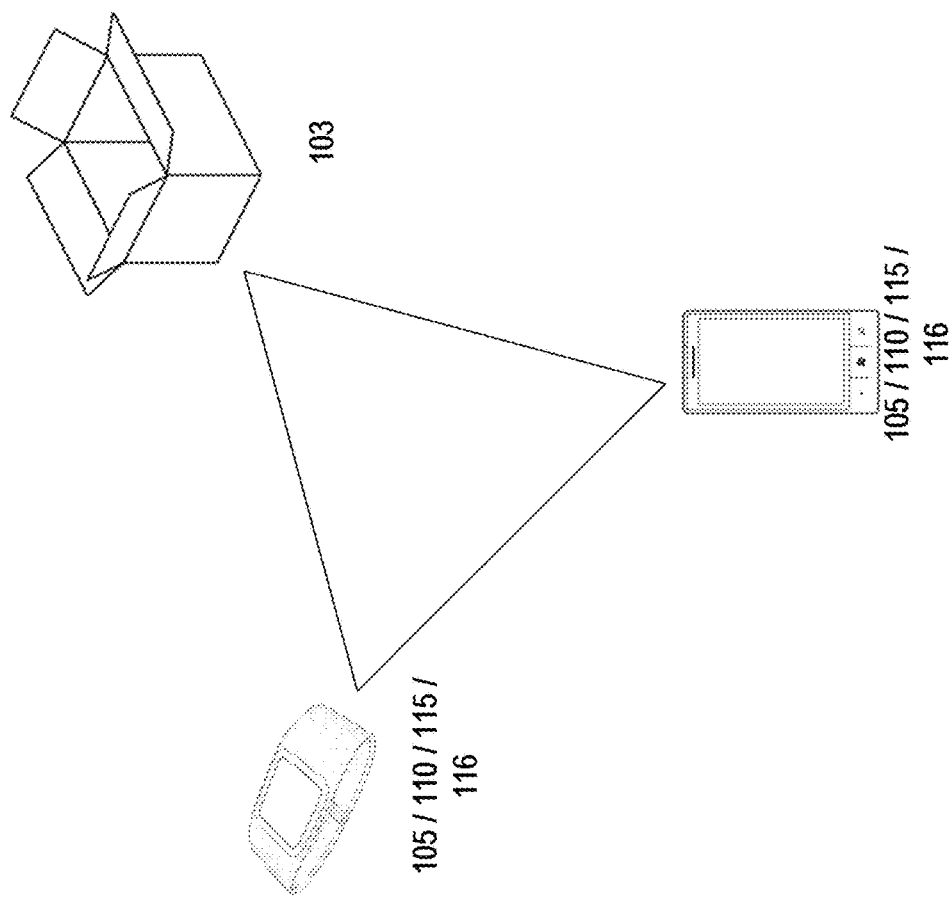
Figure 11:
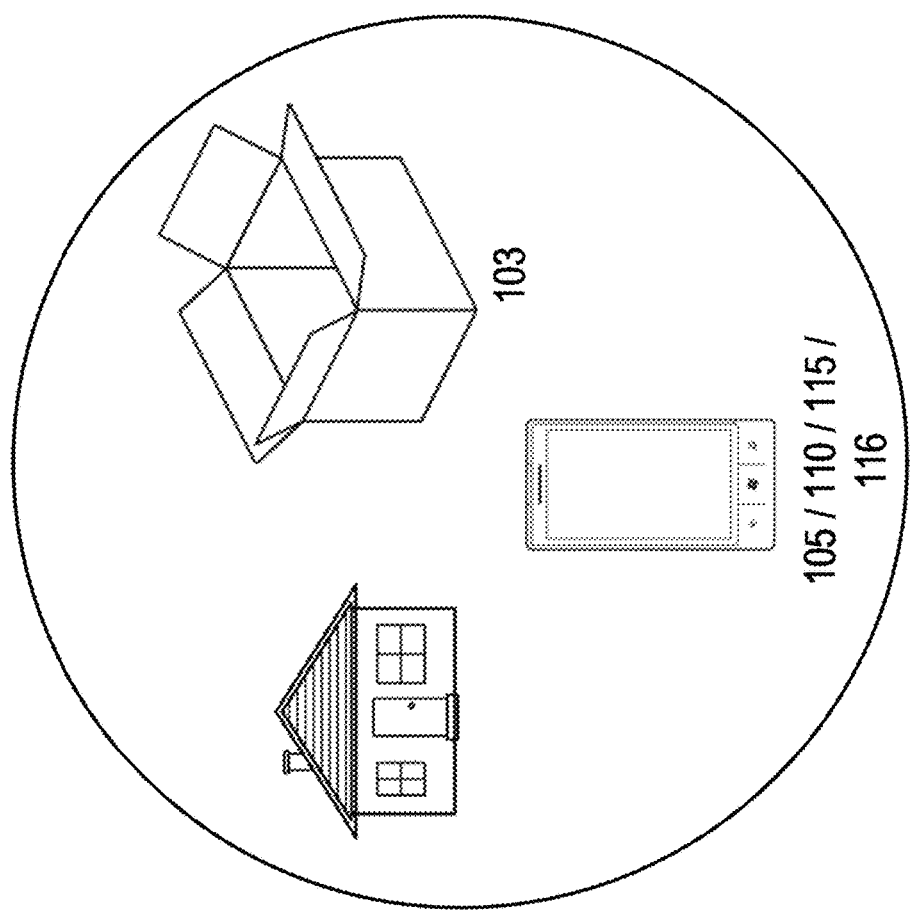
Figure 12:
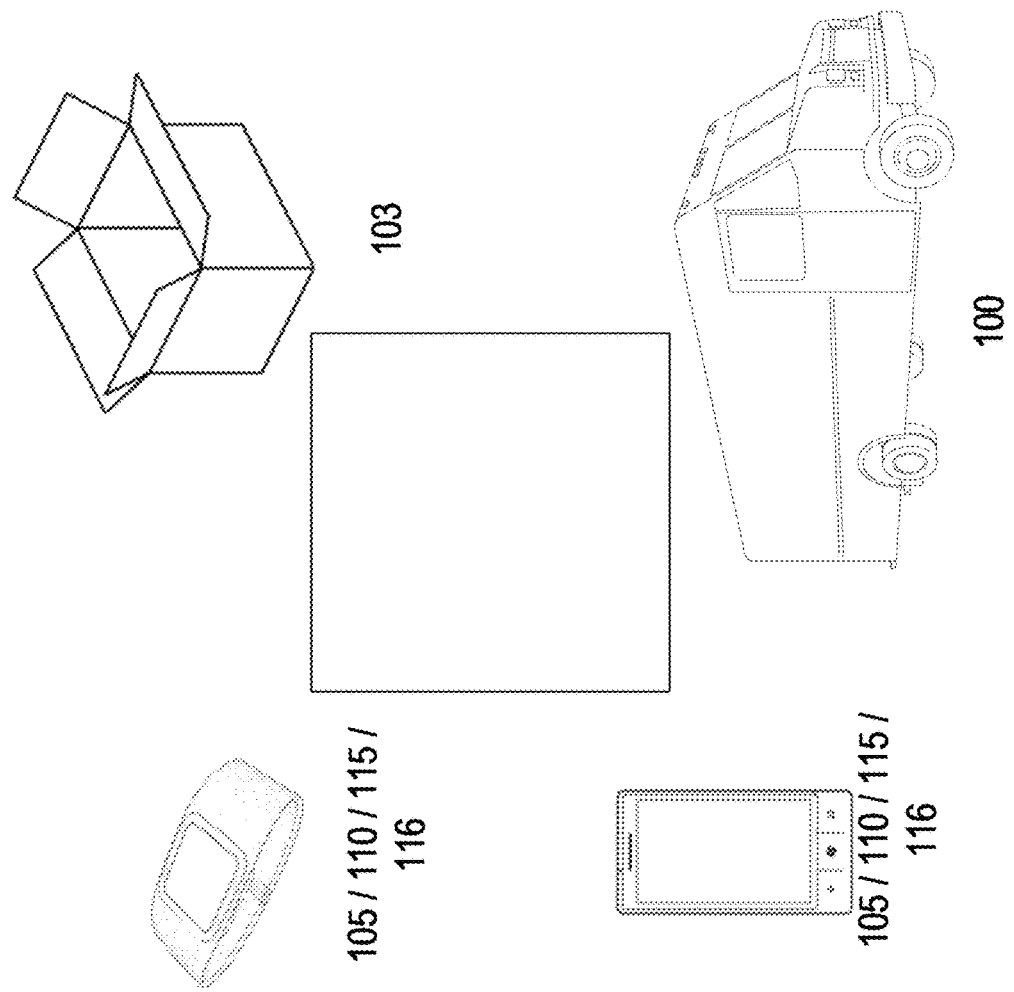
Figure 13:
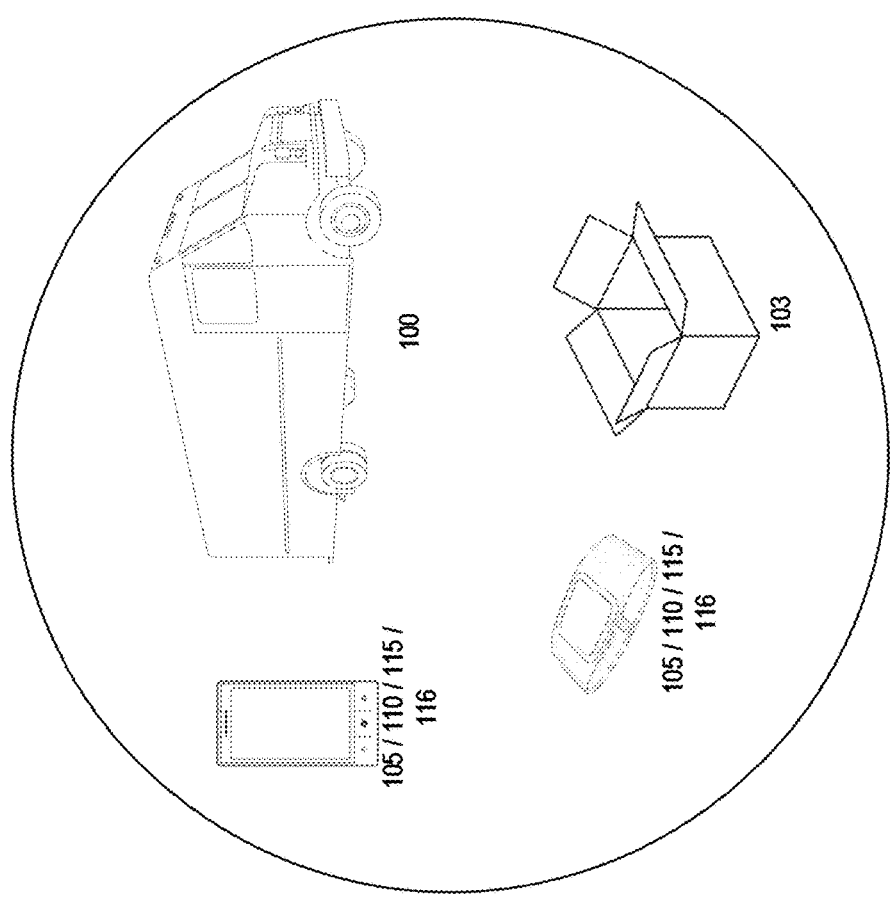
Figure 14:
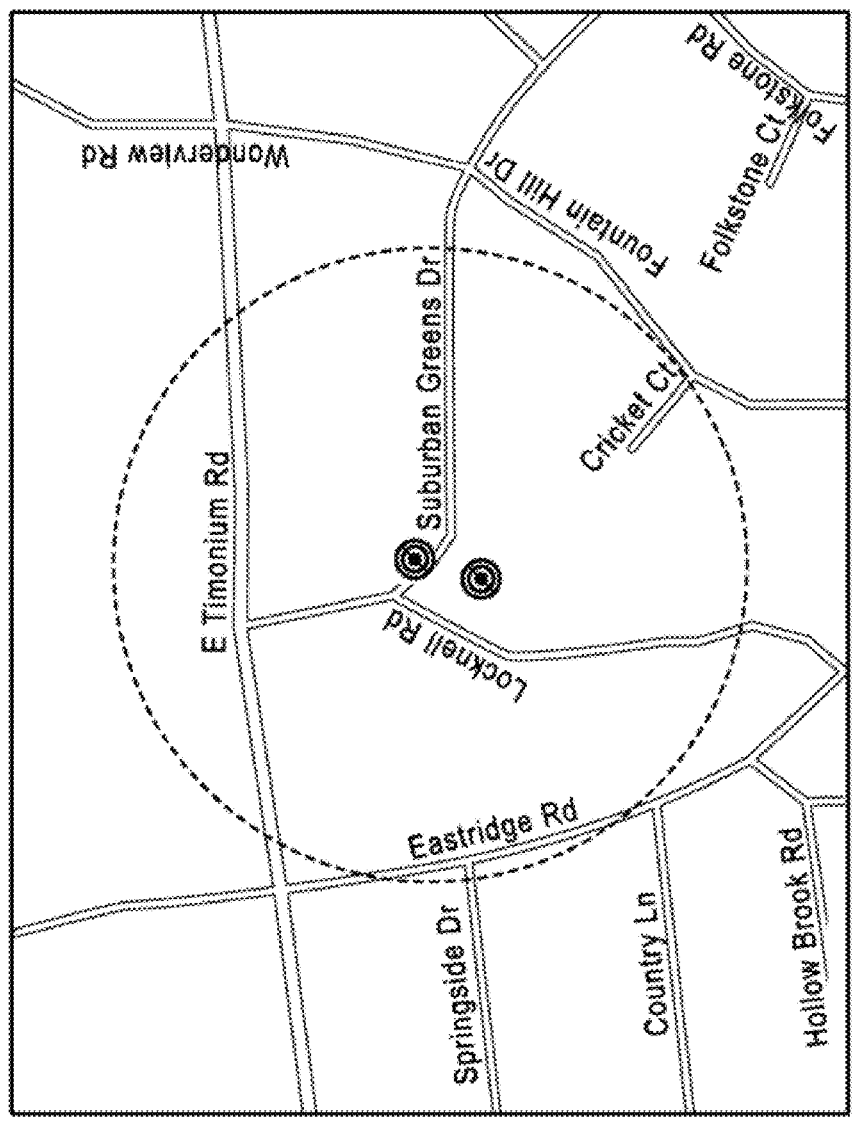
Figure 15:
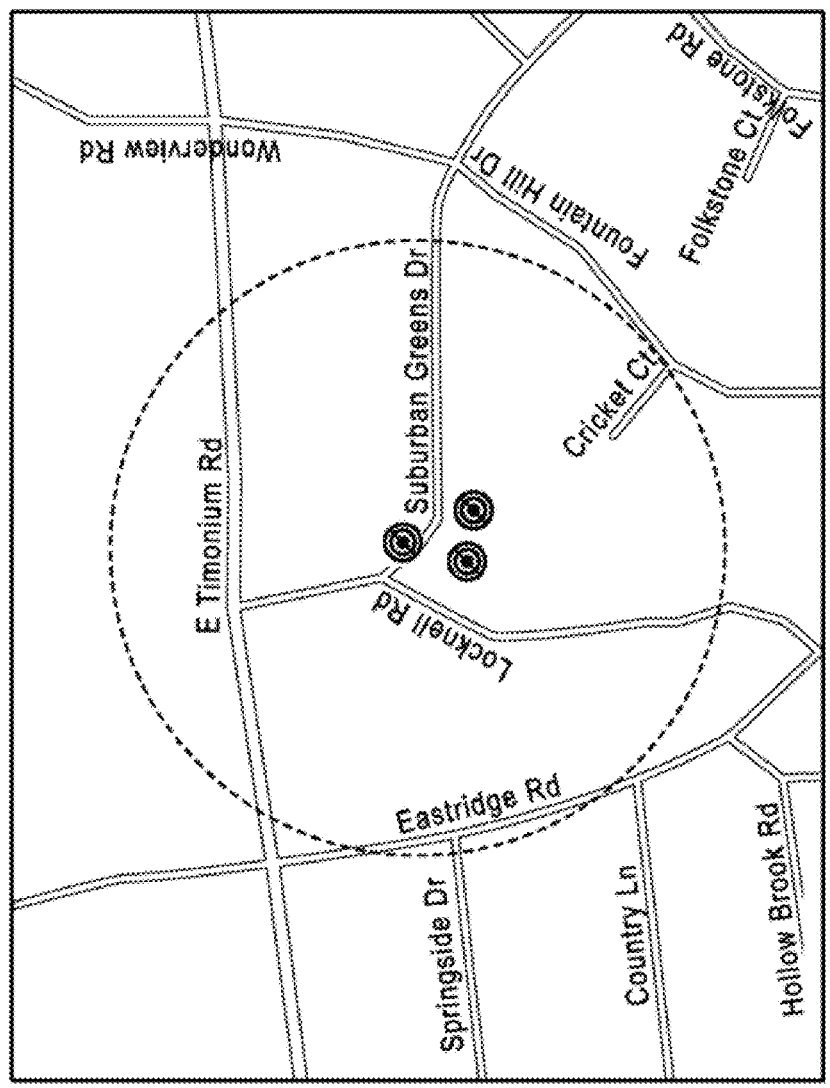
Figure 16:
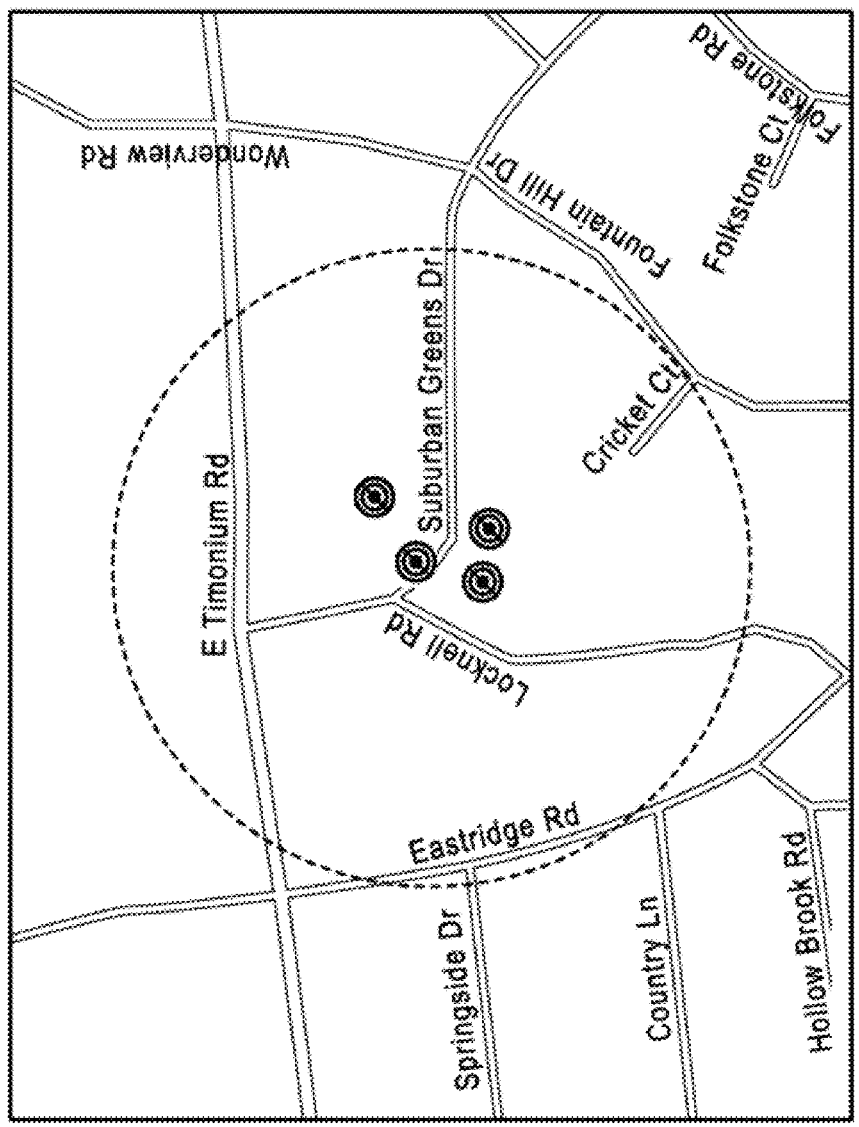

In one embodiment, the level 3 example applies to location-based notifications/messages and/or deliveries at the front door of a registered home (See FIGS. 10, 11, 15). As will be recognized, in the delivery context, such deliveries may include leaving the item 103 near the front door of a residence in a highly-visible location. Thus, as an added measure of security, in this example, level 3 requires that John's mobile device (e.g., registered smartphone or wearable), John's home/residence (e.g., or a desktop, television, smart thermostat, and/or the like at the home/residence), and John's vehicle 100 be properly determined as being within the configurable/determinable parameters (e.g., being within a geofence, a zone of confidence, or a defined proximity of one another). As will be recognized, this added level of security increases the likelihood that a notification/message is generated in a time-appropriate matter and/or that John is present at the delivery location (e.g., his mobile device and vehicle 100) to minimize the risk of releasing the item.

As will be recognized, any number and type of configurable/determinable parameters and configurable levels can be used with embodiments of the present invention. For example, FIG. 7 includes two additional examples of configurable levels: level 4 and level 5. In one example, level 4 requires that John's mobile device (e.g., registered smartphone or wearable), John's work location (e.g., or a desktop, television, smart thermostat, and/or the like at John's work), John's vehicle 100, and the item 103 being delivered be properly determined as being within the configurable/determinable parameters (e.g., being within a geofence, a zone of confidence, or a defined proximity of one another)—See FIGS. 12, 13, 16. Similarly, the level 5 example requires that John's mobile device (e.g., registered smartphone or wearable), John's work location (e.g., or a desktop, television, smart thermostat, and/or the like at John's work), John's vehicle 100, the item 103 being picked up or delivered, and a carrier mobile entity (e.g., user computing entity 115) be properly determined as being within the configurable/determinable parameters (e.g., being within a geofence, a zone of confidence, or a defined proximity of one another). As will be recognized, a variety of other approaches and techniques can be used to adapt to various needs and circumstances.

2. Location-Based Notifications/Messages

In another embodiment, the carrier computing entity 105 (and/or other appropriately configured computing entities) can automatically provide (e.g., generate, queue, and/or transmit) one or more location-based notifications/messages based on the configurable/determinable parameters for a given account (messages to both consignors and/or consignees). For example, the carrier computing entity 105 (and/or other appropriately configured computing entities) can automatically provide the location-based notifications/messages to the electronic destination addresses regarding items that have been picked-up or delivered or have been attempted to be picked-up or delivered. As will be recognized, this may include generating, queuing, and/or transmitting an email message to a customer's email address, a text message to a customer's cellular phone, a notification/message to a designated application, and/or the like based on the configurable/determinable parameters.

In one embodiment, to provide the location-based notifications/messages, the carrier computing entity 105 (and/or a variety of other computing entities) may perform location-based monitoring or determinations based on the configurable/determinable parameters for a given account (Block 515 of FIG. 5). The location-based monitoring or determinations for entities and/or locations may be performed by an appropriate computing entity regularly, periodically, continuously, during certain time periods or time frames, on certain days, upon determining the occurrence of one or more configurable triggers/events, in response to requests, in response to determinations/identifications, combinations thereof, and/or the like. For example, an appropriate computing entity can monitor or determine/identify the locations of the various entities (e.g., vehicles 100, items 103, carrier computing entities 105, customer computing entities 110, user computing entities 115, establishment computing entities 116, location sensors 120, telematics sensors 125, information/data collection devices 130, and/or the like) and/or establishments/locations in response to certain triggers/events or requests. For example, the monitoring or determinations may only occur after items have been picked-up or delivered or have been attempted to be picked-up or delivered. In this example, the delivery or pick up of an item 103 or the attempted delivery or pick up of an item 103 may trigger the setting a monitoring flag, initiate the monitoring, initiate a determination, and/or the like. Similarly, in one embodiment, the delivery or pick up of an item 103 or the attempted delivery or pick up of an item 103 may trigger the automatic generation and queueing of one or more notifications/messages regarding the same. The notifications/messages can be automatically provided when the relevant configurable/determinable parameters are satisfied.

In one embodiment, the monitoring or determining/identifying can be initiated using a variety of different triggers. For examples, the triggers/events may include (a) a customer's vehicle or a designated carrier vehicle 100 being turned on or off; (b) a customer's vehicle 100 or a designated carrier vehicle 100 beginning to move; (c) a customer's vehicle 100 or a designated carrier vehicle 100 slowing to a stop; (d) an entity moving out of a geofenced area; (e) an entity moving into a geofenced area; and/or a variety of other triggers/events. As will be recognized, a variety of other approaches and techniques can be used to adapt to various needs and circumstances.

In one embodiment, if a configurable trigger/event is not detected or a request is not re received, an appropriate computing entity (e.g., carrier computing entity 105, customer computing entity 110, user computing entity 115, establishment computing entity 116, and/or the like) can determine/identify whether a configurable time period has begun or ended. If the appropriate computing entity (e.g., carrier computing entity 105, customer computing entity 110, user computing entity 115, establishment computing entity 116, and/or the like) determines/identifies that the configurable time period has not begun or ended, the appropriate computing entity can continue monitoring for configurable triggers/events or requests. However, if the appropriate computing entity (e.g., carrier computing entity 105, customer computing entity 110, user computing entity 115, establishment computing entity 116, and/or the like) determines/identifies that the configurable time period has begun or ended, the appropriate computing entity can continuously monitor whether the relevant configurable/determinable parameters are satisfied. The monitoring may continue indefinitely, until the occurrence of one or more configurable triggers/events, until a configurable time period has elapsed, combinations thereof, and/or the like.

Generally, the locations of various establishments/locations and/or entities (carrier computing entities 105, customer computing entities 110, user computing entities 115, establishment computing entities 116, location sensors 120, telematics sensors 125, information/data collection devices 130, establishments/locations, and/or the like) can be monitored or determined/identified by any of a variety of computing entities—including carrier computing entities 105, customer computing entities 110, user computing entities 115, establishment computing entities 116, and/or the like. For example, the locations may be monitored or determined/identified with the aid of or in coordination with location-determining devices, location-determining aspects, location-determining features, location-determining functionality, location-determining sensors, and/or other location services. Such may include GPS; cellular assisted GPS; real time location systems or server technologies using received signal strength indicators from a Wi-Fi network); triangulating positions in connection with a variety of other systems, including cellular towers, Wi-Fi access points, and/or the like; and/or the like. Using these and other approaches and techniques, an appropriate computing entity (e.g., carrier computing entity 105, customer computing entity 110, user computing entity 115, establishment computing entity 116, establishments, and/or the like) can determine, for example, whether and when establishments/locations and/or entities are within a configurable/determinable distance/proximity from one another (Block 520 of FIG. 5).

In one embodiment, the configurable/determinable distance/proximity may be a distance, range, zone of confidence, proximity, geofence, tolerance, and/or similar words used herein interchangeably. For example, in one embodiment, the configurable/determinable distance/proximity may be plus or minus (±) a specific distance or range using a coordinate system (e.g., DD, DMS, UTM, and/or CARRIER). As will be recognized, a configurable/determinable distance/proximity may be in a variety of formats, such as degrees, minutes, seconds, feet, meters, miles (e.g., 3, 15, 30, or 50 feet), kilometers, and/or the like. Continuing with the above example, an appropriate computing entity may use a configurable/determinable distance/proximity of ±0.000001, ±0.000001 in the DD coordinate system (or configurable/determinable distance/proximitys of ±0.000100, ±0.000100 or ±0.000010, ±0.000010) to determine/identify when configurable/determinable parameters for a customer are satisfied.

In the event establishments/locations and/or entities are within a configurable/determinable distance/proximity from each other (e.g., associated with one another) in accordance with the configurable/determinable parameters, an appropriate computing entity (e.g., carrier computing entity 105, customer computing entity 110, user computing entity 115, establishment computing entity 116, establishments, and/or the like) can make this determination/identification and indicate or provide an indication of the same. The indication may include device/entity information/data associated with the corresponding customer computing entity 110 and/or customer computing entity 110, such as the corresponding device identifiers and names. The indication may also include other information/data, such as the location at which the establishments/locations and/or entities became within the configurable/determinable distance/proximity of each other, the time at which the entities became within the configurable/determinable distance/proximity of each other, the type of event (e.g., picking up an item, delivering an item, and/or the like), and/or the like. In some embodiments, the appropriate computing entity can determine/identify the type of event. The appropriate computing entity (e.g., carrier computing entity 105, customer computing entity 110, user computing entity 115, establishment computing entity 116, establishments, and/or the like) can then store the information/data in one more records and/or in association with the account, subscription, program, and/or the like corresponding to the customer.

The appropriate computing entity can also provide location-based notifications/messages in accordance with the corresponding notification/message preferences (Block 520 of FIG. 5). In one embodiment, an appropriate computing entity can provide location-based notifications/messages when the configurable/determinable parameters are satisfied. For instance, when an appropriate computing entity can determines/identifies that the configurable/determinable parameters for an account are satisfied, the appropriate computing entity can automatically provide appropriate location-based queued notifications/messages and/or automatically generate, queue, and transmit appropriate location-based notifications/messages in compliance with the corresponding notification/message preferences. By way of example, in the level 2 example, assume John (carrying his mobile phone 110) arrives at his residence (34.3218697, −83.1239871) and enters a geofence or is within a configurable/determinable distance/proximity (e.g., ±0.000001, ±0.000001) of his residence. An appropriate computing entity can make such a determination/identification based on the monitoring (see FIG. 14). In response, an appropriate computing entity (e.g., carrier computing entity 105, user computing entity 115, and/or the like) can automatically provide appropriate location-based queued notifications/messages and/or automatically generate, queue, and transmit appropriate location-based notifications/messages.

Figure 17:
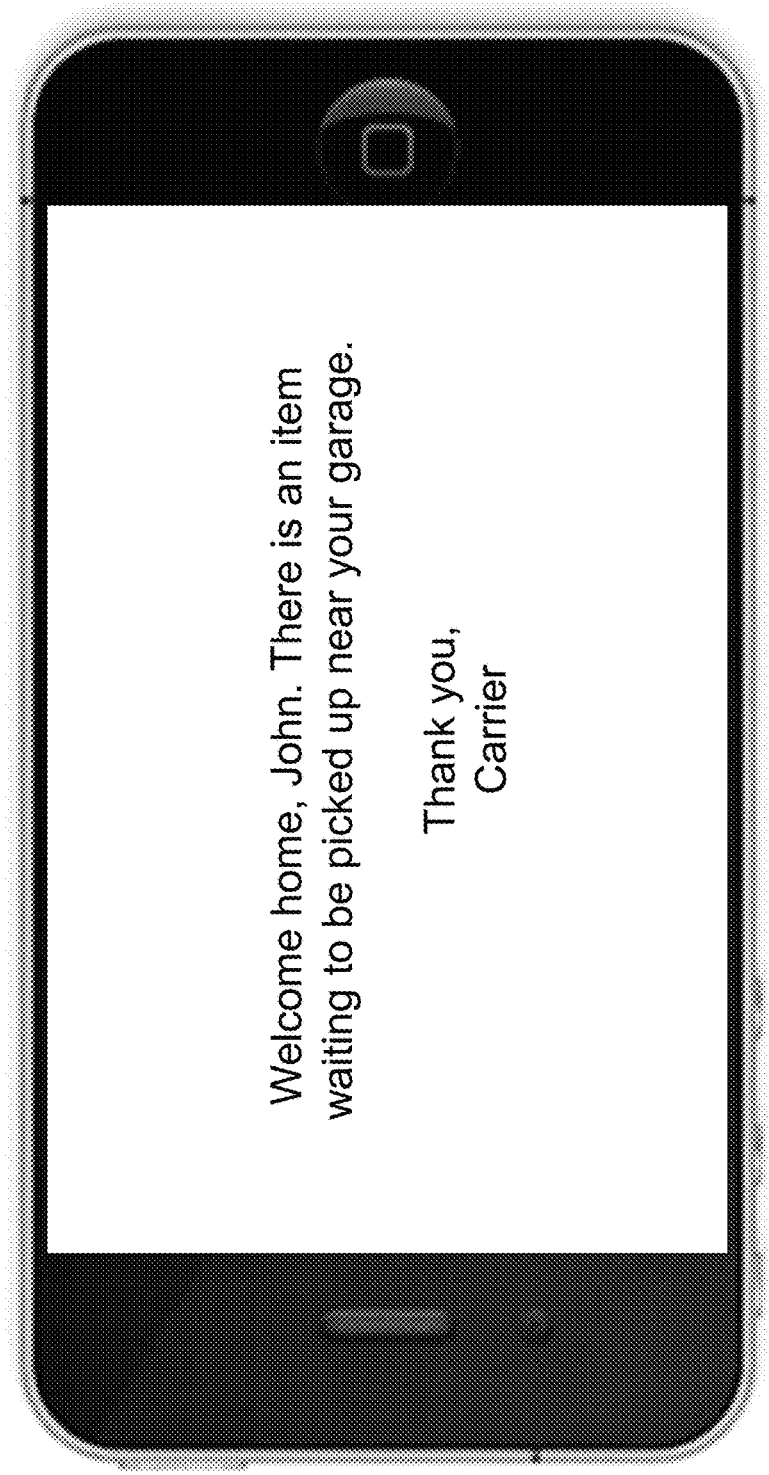
Figure 18:
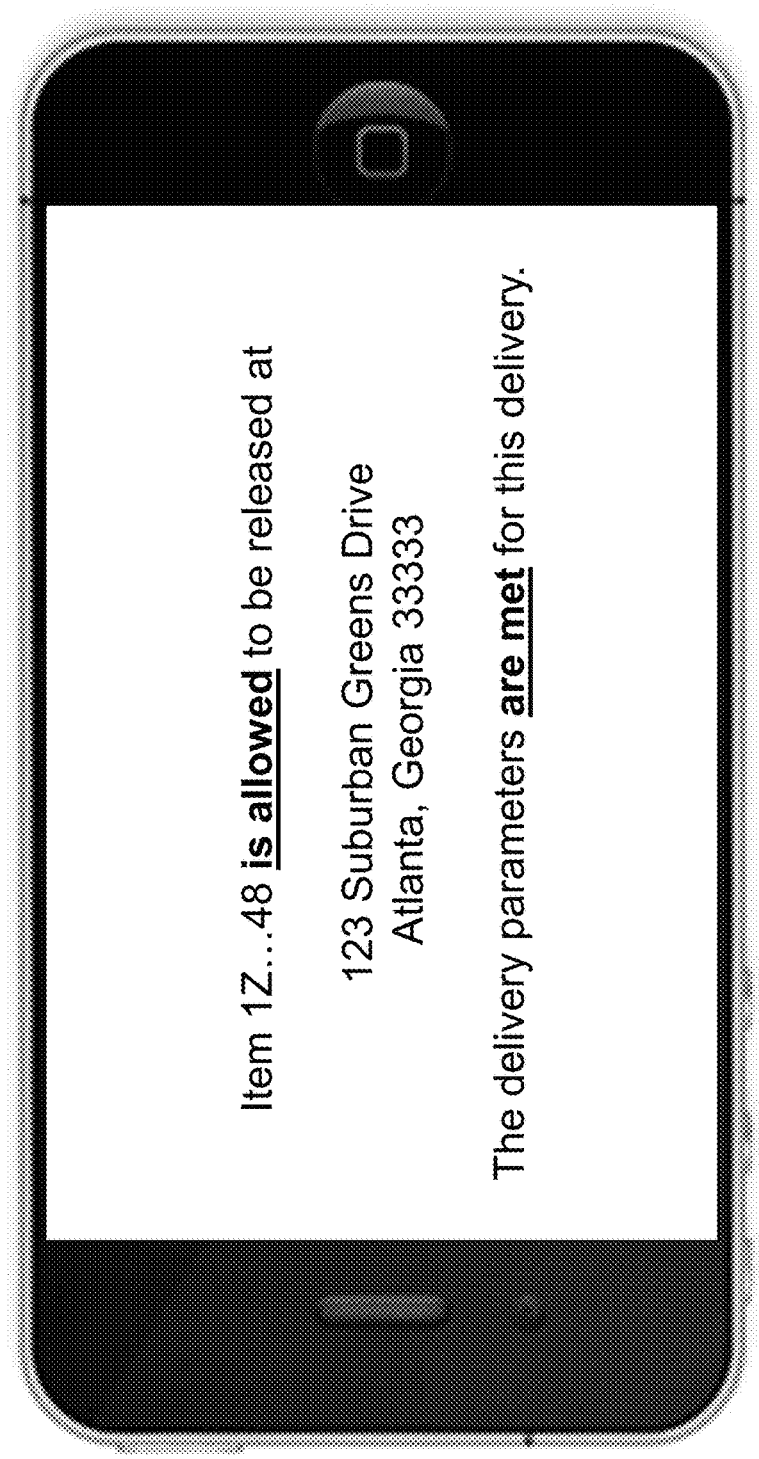
Figure 19:
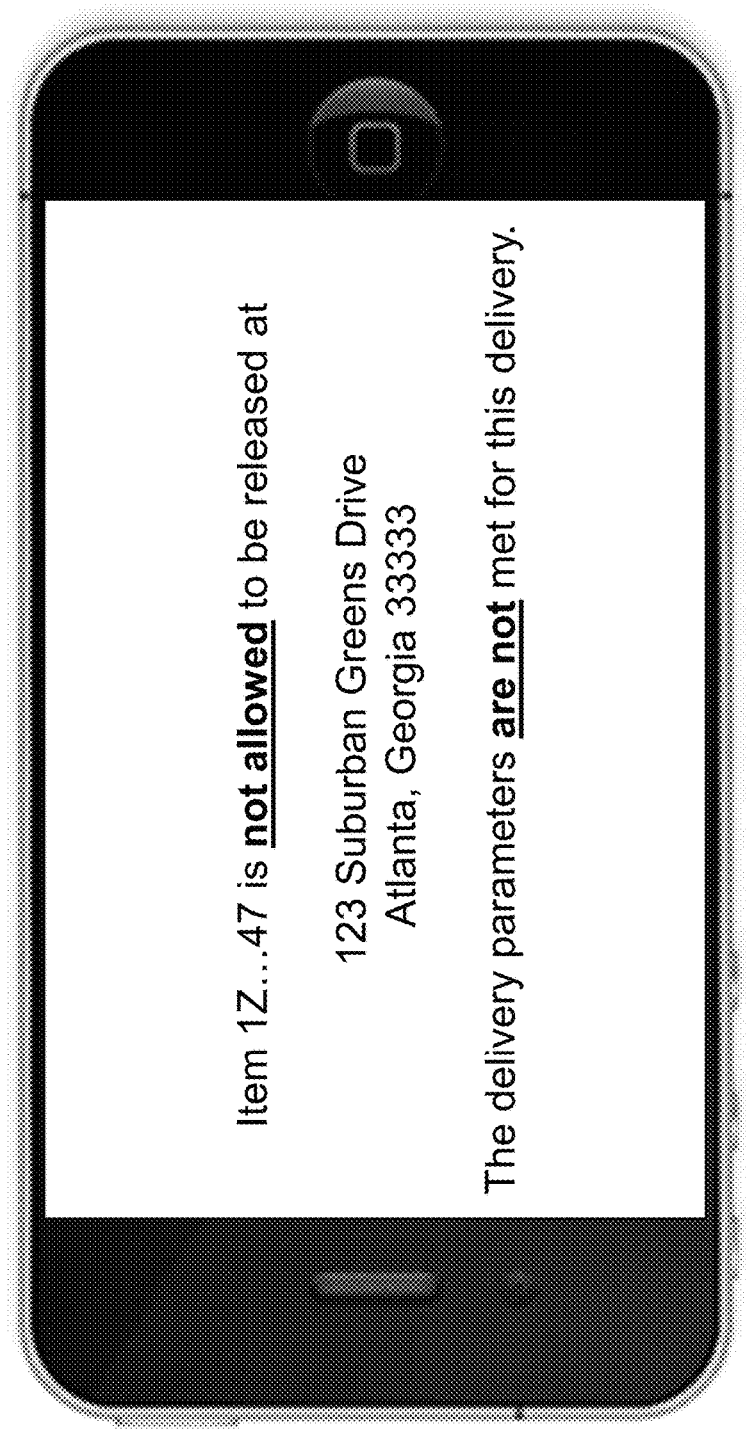

As will be recognized, a variety of types of notifications/messages can be provided. FIG. 17 shows an exemplary notification/message providing regarding a completed delivery of an item. For example, FIG. 17 shows a notification/message (e.g., a text message) that indicates where an item 103 has been delivered and can be retrieved by the customer. This location-based notification/message is provided to the customer in a time-appropriate manner (e.g., when he or she arrives at home or is in a physical location in which the item 103 is close to the customer). As will be recognized, the notification/message may include images, links, advertisements, and/or the like. For example, the images and links may provide information about the location of the item 103 (e.g., a picture of where the image is placed or open a map application that guides the customer to the item. As will be recognized, the notifications/messages can be provided in accordance with user notification/message preferences. For instance, the carrier computing entity 105 (and/or other appropriately configured computing entities) can automatically generate, queue, and/or transmit (e.g., provide) email notifications/messages to email addresses, text notifications/messages to cellular phones or applications, notifications/messages to designated applications, and/or the like.

In the level 3 example, assume John drives his vehicle 100 home and has his mobile phone 110 on his person when arrives at his residence (34.3218697, −83.1239871). Upon doing so, John (e.g., the vehicle 100 and mobile phone 110) enters a geofence or is within a configurable/determinable distance/proximity of his residence. An appropriate computing entity can make such a determination/identification based on the monitoring (see FIG. 15). In response, an appropriate computing entity (e.g., carrier computing entity 105, user computing entity 115, and/or the like) can automatically provide appropriate location-based queued notifications/messages and/or automatically generate, queue, and transmit appropriate location-based notifications/messages.

In the level 4 example, assume John drives his vehicle 100 to work and has his mobile phone 110 on his person when arrives at work (33.7869128, −84.3875602). Upon doing so, John (e.g., the vehicle 100 and mobile phone 110) enters a geofence or is within a configurable/determinable distance/proximity of his work and the item 103 that has been delivered there. That is, the work location, vehicle 100, mobile phone 110, and item 103 are all within a configurable/determinable distance/proximity from one another, within a geofenced, and/or the like. An appropriate computing entity can make such a determination/identification based on the monitoring (see FIG. 16). In response, an appropriate computing entity (e.g., carrier computing entity 105, user computing entity 115, and/or the like) can automatically provide appropriate location-based queued notifications/messages and/or automatically generate, queue, and transmit appropriate location-based notifications/messages.

In the level 5 example, assume John drives his vehicle 100 to work and has his mobile phone 110 on his person when arrives at work (33.7869128, −84.3875602). Upon doing so, John (e.g., the vehicle 100 and mobile phone 110) enters a geofence or is within a configurable/determinable distance/proximity of his work and the item 103 and the carrier pick-up/delivery person (operating a user computing entity 115) delivering the item. That is, the work location, vehicle 100, mobile phone 110, item, and user computing entity are all within a configurable/determinable distance/proximity from one another, within a geofenced, and/or the like. An appropriate computing entity can make such a determination/identification based on the monitoring (not shown). In response, an appropriate computing entity (e.g., carrier computing entity 105, user computing entity 115, and/or the like) can automatically provide appropriate location-based queued notifications/messages and/or automatically generate, queue, and transmit appropriate location-based notifications/messages.

3. Location-Based Events

In one embodiment, the carrier computing entity 105 (and/or other appropriately configured computing entities) can automatically determine whether specific events/actions are allowed or disallowed or trigger specific events/actions (e.g., initiating shipment of an item, initiating movement of an item, generating shipping data, initiating payment, and/or the like) based on the defined configurable/determinable parameters for a given account and/or event. As noted, such events can include allowing or disallowing the pick-up or delivery of items, allowing or disallowing driver release of items, and/or the like. Correspondingly, responsive to such determinations, the carrier computing entity 105 (and/or other appropriately configured computing entities) can automatically provide notifications/messages to a carrier pick-up/delivery person regarding the same (See FIGS. 18 and 19). For example, the carrier computing entity 105 can provide messages/notifications to a user computing entity 115 (operated by a carrier pick-up/delivery person) regarding whether he or she is allowed or disallowed to deliver or pick up an item 103 based on the configurable/determinable parameters. In other contexts, the notifications/messages can comprise an instruction to carry out or initiate an event/actions, such as an instruction to initiate shipment of an item, initiate movement of an item, generate shipping data, initiate payment, and/or the like.

In one embodiment, the carrier computing entity 105 (and/or a variety of other computing entities) may perform location-based determinations based on the configurable/determinable parameters (e.g., security, time, weather, temperature, altitude, national security level, and/or the like) for a given account (Blocks 525, 530, 535 of FIG. 5). The location-based determinations for entities and/or locations may be performed by an appropriate computing entity upon determining the occurrence of one or more configurable triggers/events, in response to requests, in response to determinations/identifications, combinations thereof, and/or the like. In one example, the determining/identifying can be initiated using a variety of different triggers—(a) a designated carrier vehicle 100 being turned on or off; (b) a designated carrier vehicle 100 beginning to move; (c) a designated carrier vehicle 100 slowing to a stop; (d) an entity moving out of a geofenced area; (e) an entity moving into a geofenced area; and/or a variety of other triggers/events. In one embodiment, the determining/identifying can be initiated in response to a request or determination (Block 525 of FIG. 5), such as (a) a scan of an item 103 at a pick-up or delivery location (e.g., a carrier pick-up/delivery person operating a user computing entity 115 to scan an item 103 and/or request instructions from the carrier computing entity 105); (b) a determination that an item 103 will be delivered in the next 5 or 10 minutes (configurable time period); (c) a determination that an item 103 is among the next 5 or 7 items 103 to be delivered (configurable number); and/or a variety of other requests or determinations. As will be recognized, a variety of other approaches and techniques can be used to adapt to various needs and circumstances. Regardless of how the determination is initiated, an appropriate computing entity can determine whether the corresponding configurable/determinable parameters are satisfied.

Generally, the locations of various establishments/locations and/or entities (carrier computing entities 105, customer computing entities 110, user computing entities 115, establishment computing entities 116, location sensors 120, telematics sensors 125, information/data collection devices 130, establishments/locations, and/or the like) can be determined/identified by any of a variety of computing entities (Block 530 of FIG. 5). For example, the locations may be determined/identified with the aid of or in coordination with location-determining devices, location-determining aspects, location-determining features, location-determining functionality, location-determining sensors, and/or other location services. Such may include GPS; cellular assisted GPS; real time location systems or server technologies using received signal strength indicators from a Wi-Fi network); triangulating positions in connection with a variety of other systems, including cellular towers, Wi-Fi access points, and/or the like; and/or the like. Using these and other approaches and techniques, an appropriate computing entity (e.g., carrier computing entity 105, customer computing entity 110, user computing entity 115, establishment computing entity 116, establishments, and/or the like) can determine, for example, whether and when establishments/locations and/or entities are within a configurable/determinable distance/proximity (e.g., relative space) from one another.

In the event establishments/locations and/or entities are within a configurable/determinable distance/proximity from each other (e.g., associated with one another) in accordance with the configurable/determinable parameters, an appropriate computing entity (e.g., carrier computing entity 105, user computing entity 115) can make this determination/identification and indicate or provide a notification/message regarding the same. The following examples are provided in the context of a carrier pick-up/delivery person performing a delivery of items. For instance, in the examples, a carrier pick-up/delivery person (operating a user computing entity 115) can scan an item, read an item, interrogate an item, or communicate with an item. The scanning, reading, interrogating, or communicating can generate a request to allow or disallow an event, such as the pick-up or delivery of an item. In certain embodiments, the event type is automatically determined based on context (e.g., by the item 103 being scanned by a carrier pick-up/delivery person that only delivery and pick up items). In other embodiments, the event type is input by a carrier pick-up/delivery person via the user computing entity 115 (e.g., delivery, pick-up, delivery at garage, pick-up at residence, and/or the like), which can be included in the request.

In the level 2 example, assume a carrier pick-up/delivery person is attempting to drop off an item 103 at John's garage for delivery. As part of the process, the carrier pick-up/delivery person scans the item 103 (or the item is read, interrogated, communicated with, and/or the like) using a user computing entity 115, which generates a request to the carrier computing entity 105 to allow or disallow the event. As noted, the event type to be allowed or disallowed can be automatically determined or input by the carrier pick-up/delivery person and included as part of the request. In response to the request, an appropriate computing entity can determine whether the registered entities and/or locations satisfy the corresponding configurable/determinable parameters. In this example, if John's mobile phone 110 is within a configurable/determinable distance/proximity of his residence, the appropriate computing entity will allow the event and provide a notification/message to the user computing entity 115 regarding the same (see FIG. 18). Otherwise, the appropriate computing entity will disallow the event and provide a notification/message to the user computing entity 115 regarding the same (see FIG. 19).

In the level 3 example, assume a carrier pick-up/delivery person is attempting to drop off an item 103 at John's front door for delivery. As part of the process, the carrier pick-up/delivery person scans the item 103 using a user computing entity 115, which generates a request to the carrier computing entity 105 to allow or disallow the event. In response to the request, an appropriate computing entity can determine whether the registered entities and/or locations satisfy the corresponding configurable/determinable parameters. In this example, if John's mobile phone 110 and vehicle 100 are within a configurable/determinable distance/proximity of his residence, the appropriate computing entity will allow the event and provide a notification/message to the user computing entity 115 regarding the same (see FIG. 18). Otherwise, the appropriate computing entity will disallow the event and provide a notification/message to the user computing entity 115 regarding the same (see FIG. 19). Similar approaches can be carried out for level 4 or level 5, and any other configurable level with corresponding configurable/determinable parameters. As will be recognized, a variety of other approaches and techniques can be used to adapt to various needs and circumstances. Also, as noted, in other contexts, the notifications/messages can comprise an instruction to carry out or initiate an event/actions, such as an instruction to initiate shipment of an item, initiate movement of an item, generate shipping data, initiate payment, and/or the like. As will be recognized, a variety of other approaches and techniques can be used to adapt to various needs and circumstances.

IV. CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A method for using one or more configurable security parameters for providing notifications for events the method comprising:
   receiving, via one or more processors, one or more configurable security parameters, wherein the one or more configurable security parameters (a) are input via a first interactive user interface by a customer, the first interactive user interface executing on a first customer computing entity associated with the customer, (b) define an event type comprising at least one of a pick-up or a delivery of an item, and (c) identify the first customer computing entity associated with the customer and a second computing entity associated with the customer;
   storing, via the one or more processors, the one or more configurable security parameters in association with an account for the customer; and
   responsive to receiving a request to allow or disallow an event:
      identifying, via the one or more processors and based at least in part on the request, the account for the customer,
      determining, via the one or more processors, an event type for the request, wherein the request originates from a carrier computing entity associated with a pickup/delivery person,
      identifying, via the one or more processors, (a) the real-time geolocation of the first customer computing entity based at least in part on first location information generated by the first customer computing entity, (b) the real-time geolocation of the second customer computing entity based at least in part on second location information provided by the second customer computing entity, and (c) the real-time geolocation of the carrier computing entity based at least in part on third location information provided by the carrier computing entity, and
      determining, via the one or more processors and based at least in part on their respective real-time geolocations, whether the first customer computing entity, the second customer computing entity, and the carrier computing entity are within a configurable distance from each other; and
   responsive to determining that the first customer computing entity, the second customer computing entity, and the carrier computing entity are within the configurable distance from each other:
      automatically providing, via the one or more processors, a notification for the first customer computing entity to display via the first interactive user interface, the notification (a) provided to a first electronic destination address for the first customer computing entity, and (b) comprising an indication that the event is allowed, and
      automatically providing, via the one or more processors, a notification to for the carrier computing entity to display via a third interactive user interface, the notification (a) provided to a third electronic destination address for the carrier computing entity, and (b) comprising an indication that the pickup/delivery person is allowed to perform the event.

2. The method of claim 1 further comprising monitoring the first customer computing entity, the second customer computing entity, and the carrier computing entity.

3. The method of claim 2, wherein the monitoring is performed on a periodic basis, a regular basis, or a continuous basis.

4. The method of claim 2, wherein the monitoring is performed in response to one or more triggers.

5. An apparatus for using one or more configurable security parameters for providing notifications for events, the apparatus comprising at least one processor and at least one memory including program code, the at least one memory and the program code configured to, with the processor, cause the apparatus to at least:
   receive one or more configurable security parameters, wherein the one or more configurable security parameters (a) are input via a first interactive user interface by a customer, the first interactive user interface executing on a first customer computing entity associated with the customer, (b) define an event type comprising at least one of a pick-up or a delivery of an item, and (c) identify the first customer computing entity associated with the customer and a second customer computing entity associated with the customer;
   store the one or more configurable security parameters in association with an account for the customer; and
   responsive to receiving a request to allow or disallow an event:
      identify, based at least in part on the request, the account for the customer,
      determine an event type for the request, wherein the request originates from a carrier computing entity associated with a pickup/delivery person,
      identify (a) the real-time geolocation of the first customer computing entity based at least in part on first location information generated by the first customer computing entity, (b) the real-time geolocation of the second customer computing entity based at least in part on second location information provided by the second customer computing entity, and (c) the real-time geolocation of the carrier computing entity based at least in part on third location information provided by the carrier computing entity, and
      determine, based at least in part on their respective real-time geolocations, whether the first customer computing entity, the second customer computing entity, and the carrier computing entity are within a configurable distance from each other; and
   responsive to determining that the first customer computing entity, the second customer computing entity, and the carrier computing entity are within the configurable distance from each other:
      automatically provide a notification for the first customer computing entity to display via the first interactive user interface, the notification (a) provided to a first electronic destination address for the first customer computing entity, and (b) comprising an indication that the event is allowed; and
      automatically provide a notification to for the carrier computing entity to display via a third interactive user interface, the notification (a) provided to a third electronic destination address for the carrier computing entity, and (b) comprising an indication that the pickup/delivery person is allowed to perform the event.

6. The apparatus of claim 5, wherein the memory and program code are further configured to, with the processor, cause the apparatus to monitor the first customer computing entity, the second customer computing entity, and the carrier computing entity.

7. The apparatus of claim 6, wherein the monitoring is performed on a periodic basis, a regular basis, or a continuous basis.

8. The apparatus of claim 6, wherein the monitoring is performed in response to one or more triggers.

9. A computer program product for using one or more configurable security parameters for providing notifications for events, the computer program product comprising at least one non-transitory computer-readable storage medium having computer-readable program code portions stored therein, the computer-readable program code portions comprising:

an executable portion configured to receive one or more configurable security parameters, wherein the one or more configurable security parameters (a) are input via a first interactive user interface by a customer, the first interactive user interface executing on a first customer computing entity associated with the customer, (b) define an event type comprising at least one of a pick-up or a delivery of an item, and (c) identify the first customer computing entity associated with the customer and a second customer computing entity associated with the customer;

an executable portion configured to store the one or more configurable security parameters in association with an account for the customer; and an executable portion configured to, responsive to receiving a request to allow or disallow an event:
identify, based at least in part on the request, the account for the customer,
determine an event type for the request, wherein the request originates from a carrier computing entity associated with a pickup/delivery person,
identify (a) the real-time geolocation of the first customer computing entity based at least in part on first location information generated by the first customer computing entity, (b) the real-time geolocation of the second customer computing entity based at least in part on second location information provided by the second customer computing entity, and (c) the real-time geolocation of the carrier computing entity based at least in part on third location information provided by the carrier computing entity, and
determine, based at least in part on their respective real-time geolocations, whether the first customer computing entity, the second customer computing entity, and the carrier computing entity are within a configurable distance from each other; and an executable portion configured to, responsive to determining that the first customer computing entity, the second customer computing entity, and the carrier computing entity are within the configurable distance from each other,
automatically provide a notification for the first customer computing entity to display via the first interactive user interface, the notification (a) provided to a first electronic destination address for the first customer computing entity, and (b) comprising an indication that the event is allowed, and
automatically provide a notification to the carrier computing entity to display via a third interactive user interface, the notification (a) provided to a third electronic destination address for the carrier computing entity, and (b) comprising an indication that the pickup/delivery person is allowed to perform the event.

10. The computer program product of claim 9, wherein the memory and program code are further configured to, with the processor, cause the apparatus to monitor the first customer computing entity, the second customer computing entity, and the carrier computing entity.

11. The computer program product of claim 10, wherein the monitoring is performed on a periodic basis, a regular basis, or a continuous basis.

12. The computer program product of claim 10, wherein the monitoring is performed in response to one or more triggers.

* * * * *

UNITED STATES PATENT AND TRADEMARK OFFICE
CERTIFICATE OF CORRECTION

PATENT NO. : 10,182,305 B2
APPLICATION NO. : 14/942034
DATED : January 15, 2019
INVENTOR(S) : Robert J. Gillen It is certified that error appears in the above-identified patent and that said Letters Patent is hereby corrected as shown below:

In the Specification

Column 20, Line 41: Please remove "proximitys" and replace with --proximity--.

In the Claims

Column 25, Line 64: Please remove "to for" and replace with --to--.
Column 26, Line 61: Please remove "to for" and replace with --to--.

Signed and Sealed this
Fifth Day of March, 2019

Andrei Iancu
*Director of the United States Patent and Trademark Office*